United States Patent
Seraji

Patent Number: 5,414,799
Date of Patent: May 9, 1995

[54] METHOD AND APPARATUS FOR ADAPTIVE FORCE AND POSITION CONTROL OF MANIPULATORS

[75] Inventor: Homayoun Seraji, La Cresenta, Calif.

[73] Assignee: California Institute of Technology, Pasadena, Calif.

[21] Appl. No.: 78,893

[22] Filed: Jun. 16, 1993

Related U.S. Application Data

[60] Continuation of Ser. No. 638,880, Jan. 7, 1991, abandoned, which is a division of Ser. No. 253,510, Sep. 30, 1988, Pat. No. 5,023,808, which is a continuation-in-part of Ser. No. 35,061, Apr. 6, 1987, Pat. No. 4,860,215.

[51] Int. Cl.⁶ .................................... G06F 15/46
[52] U.S. Cl. .................................... 395/95; 395/94; 395/96; 395/97; 395/84
[58] Field of Search .................. 395/94, 95, 96, 97, 395/84

[56] References Cited

U.S. PATENT DOCUMENTS

| | | | |
|---|---|---|---|
| 4,488,242 | 12/1984 | Tabata et al. | 395/94 |
| 4,580,229 | 4/1986 | Koyama et al. | 395/95 |
| 4,725,942 | 2/1988 | Osuka | 395/97 |
| 4,791,588 | 12/1988 | Onda et al. | 395/95 |
| 4,826,392 | 5/1989 | Hayati | 395/95 |
| 4,860,215 | 8/1989 | Seraji | 364/165 |
| 4,868,472 | 9/1989 | Daggett | 395/96 |
| 4,868,474 | 9/1989 | Lancraft et al. | 395/84 |
| 4,999,553 | 3/1991 | Seraji | 364/513 |
| 5,023,808 | 6/1991 | Seraji | 364/513 |
| 5,049,796 | 9/1991 | Seraji | 364/192 |

OTHER PUBLICATIONS

Fu et al;, "Robotics: Control, Sensing, Vision and Intelligence" 1987 by McGraw-Hill Inc.

Luh et al, "Constrained Relations between two Coordinated Industrial Robots for Motion Control", The Inter-Joural of Robotics Research vol. 6, No. 3 1987.

T. J. Tarn, A. K. Bejczy and X. Yun: "Coordinated control of two robot arms" Proc. IEEE Intern. Conf. on Robotics and Automation, pp. 1193-1202, San Francisco, Calif., 1986.

(List continued on next page.)

*Primary Examiner*—Allen R. MacDonald
*Assistant Examiner*—George Davis
*Attorney, Agent, or Firm*—Leonard Tachner

[57] ABSTRACT

The described and improved multi-arm invention of this application presents three strategies for adaptive control of cooperative multi-arm robots which coordinate control over a common load. In the position-position control strategy, the adaptive controllers ensure that the end-effector positions of both arms track desired trajectories in Cartesian space despite unknown time-varying interaction forces exerted through a load. In the position-hybrid control strategy, the adaptive controller of one arm controls end-effector motions in the free directions and applied forces in the constraint directions; while the adaptive controller of the other arm ensures that the end-effector tracks desired position trajectories. In the hybrid-hybrid control strategy, the adaptive controllers ensure that both end-effectors track reference position trajectories while simultaneously applying desired forces on the load. In all three control strategies, the cross-coupling effects between the arms are treated as "disturbances" which are compensated for by the adaptive controllers while following desired commands in a common frame of reference. The adaptive controllers do not require the complex mathematical model of the arm dynamics or any knowledge of the arm dynamic parameters or the load parameters such as mass and stiffness. Circuits in the adaptive feedback and feedforward controllers are varied by novel adaptation laws.

3 Claims, 17 Drawing Sheets

OTHER PUBLICATIONS

A. J. Koivo: "Adaptive position-velocity-force control of two manipulators," Proc. 24th IEEE Conf. on Decision and Control, pp. 1529–1532, Ft. Lauderdale, Fla., 1985.

J. Lim and D. H. Chyung: "On a control scheme for two cooperating robot arms," Proc. 24th IEEE Conf. on Decision and Control, pp. 334–337, Ft. Lauderdale, Fla., 1985.

C. O. Alford and S. M. Belyeu: "Coordinated control of two robot arms" Proc. Intern. Conf. on Robotics, pp. 468–473, Atlanta, Ga., 1984.

J. Y. S. Luh and Y. F. Zheng: "Computation of input generalized forces for robots with closed kinematic chain mechanisms," IEEE Journal of Robotics and Automation, pp. 95–103, vol. RA-1, No. 2, 1985.

O. Khatib: "Dynamic control of manipulators in Cartesian space," Proc. 6th IFToMM Congress on Theory of Machines and Mechanisms, pp. 1128–1131, New Delhi, India, 1983.

H. Seraji, M. Jamshidi, Y. T., Kim and M. Shahinpoor: "Linear multi-variable control of two-link robots," Journal of Robotic Systems, pp. 349–365, vol. 3, No. 4, 1986.

M. H. Raibert and J. J. Craig: "Hybrid position/force control of manipulators," ASME J. Dyn. Systems, Measurement and Control, vol. 102, pp. 126–133, 1981.

E. Nakano, S. Ozaki, T. Ishida and I. Kato: "Cooperational control of the anthropomorphous manipulator MELARM," Proc. 4th Intern. Conf. on Industrial Robots, pp. 251–260, 1974.

T. Ishida: "Force control in coordination of two arms," Proc. 5th Intern. Conf. on Artificial Intelligence, pp. 717–722, 1977.

S. Fujii and S. Kurono: "Coordinated computer control of a pair of manipulators," Proc. 4th World Congress on Theory of Machines and Mechanisms, pp. 411–417, Newcastle-upon-Tyne, England; 1975.

M. T. Mason: "Compliance and force control for computer controlled manipulators," IEEE Trans. Systems, Man and Cybernetics, SMC11(6), pp. 418–432, 1981.

METHOD AND APPARATUS FOR ADAPTIVE FORCE AND POSITION CONTROL OF MANIPULATORS

ORIGIN OF THE INVENTION

The invention described herein was made in the performance of work under a NASA contract and is subject to the provisions of Public Law 96517 (35 USC 202) in which the contractor has elected to retain title.

This is a continuation of application Ser. No. 07/638,580, filed on Jan. 7, 1991, now abandoned, which is a division of application Ser. No. 07/253,510, filed Sep. 30, 1988, which is a continuation-in-part of a application assigned to the same assignee and identified as a METHOD AND APPARATUS FOR ADAPTIVE FORCE AND POSITION CONTROL OF MANIPULATORS, filed on Apr. 6, 1987 having Ser. No. 07/035,061, now U.S. Pat. No. 4,860,215.

BACKGROUND OF THE INVENTION

1. Field of the Invention

This invention relates to control systems for robotic manipulators and more particularly relates to adaptive control for a plurality of robotic arms, e.g. a multi-arm system in which the cross-coupling between robotic arms through a common load is treated as though it were an externally caused disturbance.

2. Description of the Prior Art

An adaptive control system invented by this inventor is described and claimed in the above-identified application and a considerable number of publications are set forth therein, which publications are incorporated herein by reference as though they were set forth expressly herein. The prior art and references cited therein are called to the attention of the Patent Office as being of background relevance to this invention. As of this filing date, the identified application has received an Office Action and the following patents have been cited; Horack U.S. Pat. No. 4,547,858, Koyama et al U.S. Pat. No. 4,580,229; Sugimoto et al U.S. Pat. No. 4,621,332; and Osuka U.S. Pat. No. 4,725,942. These patents do not have any significant relevance to the invention herein described and claimed.

The system of the identified application is improved upon by being extended from a single arm approach to a dual-arm (or higher) approach with a novel method and apparatus being described for overcoming the cross-coupling that exists in a common load being manipulated by independently controlled manipulators, or arms, in a multi-arm system. Additional background material relevant to the development and a fuller understanding of this invention is given in the following paragraphs.

During the past decade, robot manipulators ("arms") have been utilized in industry for performing simple tasks, and it is foreseen that in the near future anthropomorphic robots will replace human operators in carrying out various complex tasks both in industry and in hazardous environments. Nevertheless, present-day robots can be considered at best as "handicapped" operators due to their single-arm structure. It is evident that a multiplicity of robot arms yields greater dexterity and increased efficiency and provides capability of handling larger loads. Dual-arm robots will therefore have capabilities which may match those of ambidextrous human operators in dexterity and efficiency.

The research on dual-arm robots is at its early stages at the present time and a few approaches are currently available. E. Nakano et al., *Cooperational Control of the Anthropomorphous Manipulator MELARM*, Proc. 4th Intern. Conf. on Industrial Robots, pp. 251–260, 1974, propose a method for control of dual-arm robots in a master/slave manner. T. Ishida, *Force Control in Coordination of Two Arms*, Proc. 5th Intern. Conf. on Artificial Intelligence, pp. 717–722, 1977, considers parallel and rotational transfer of loads using dual-arm robots. S. Fujii et al., *Coordinated Computer Control of a Pair of Manipulators*, Proc. 4th World Congress on Theory of Machines and Mechanisms, pp. 411–417, Newcastle-upon-Tyne, England, 1975, suggest a technique for dual-arm control based on the method of virtual reference. C. Alford et al., *Coordinated Control of Two Robot Arms*, Proc. Intern. Conf. on Robotics, pp. 468–473, Atlanta, Ga., 1984, describe a method for coordinated control of two arms. Y. Zheng et al., *Constrained Relations Between Two Coordinated Industrial Robots*, Proc. Machine Intelligence Conf., Rochester, N.Y., 1985 and *Computation of Input Generalized Forces for Robots with Closed Kinematic Chain Mechanisms*, IEEE Journal of Robotics and Automation, pp. 95–103, Vol. RA-1, No. 2, 1985, obtain constrained relations and control laws for two coordinated arms. T. Tarn et al., *Coordinated Control of Two Robot Arms*, Proc. IEEE Intern. Conf. on Robotics and Automation, pp. 1193–1202, San Francisco, Calif., 1986, employ the "Global" linearization technique for dual-arm control. S. Hayati, *Hybrid Position/Force Control of Multi-Arm Cooperating Robots*, Proc. IEEE Intern. Conf. on Robotics and Automation, pp. 82–89, San Francisco, Calif., 1986, and in pending U.S. Patent Application *Method and Apparatus for Hybrid Position/Control of Multi-Arm Cooperating Robot*, filed Mar. 21, 1988, Ser. No. 06/845,991 proposes a method for controlling dual-arm robots based on partitioning the load between the arms. A. Koivo, *Adaptive Position-Velocity-Force Control of Two Manipulators*, Proc. 24th IEEE Conf. on Decision and Control, pp. 1529–1532, Ft. Lauderdale, Fla., 1985, suggests an adaptive control technique for dual-arm robots using the self-tuning approach. J. Lim et al., *On a Control Scheme for Two Cooperating Robot Arms*, Proc. 24th IEEE Conf. on Decision and Control, pp. 334–337, Ft. Lauderdale, Fla., 1985, describes a positional control scheme for two cooperating robot arms.

Some recent results of single-arm adaptive control are reported in the following papers: H. Seraji, *Adaptive Control of Robotic Manipulators*, JPL Engineering Memorandum 347–182, January, 1986; H. Seraji, *Direct Adaptive Control of Manipulators in Cartesian Space*, Journal of Robotic Systems, February, 1987 (to appear); and H. Seraji, *Adaptive Forces and Position Control of Manipulators*, JPL Engineering Memorandum 347–192, October, 1986.

The above-identified articles, to the extent that they are properly considered prior art, do not teach or suggest that a dual-arm adaptive control system, nor such a system having adaptive hybrid control of each arm independently. Moreover, only in this application is it taught that a multi-arm adaptive control system is reliably operable so long as the load's inter-arm cross-coupling is treated as though that cross-coupling were an externally caused disturbance. The adaptive hybrid control system of this invention can compensate for that cross-coupling because of the novel force and/or position control laws as herein defined.

There are certain key differences between my single-arm invention's approach and the conventional hybrid control approach of Raibert and Craig, referred to above. Firstly, in my single-arm invention, the force or position control problems are formulated in the Cartesian space with the end-effector Cartesian forces as the manipulated variables; whereas in Raibert and Craig, the problems are formulated in the joint space. The single-arm invention's formulation results in computational improvement since inverse Jacobians are not required for the controllers' operation. Secondly, the single-arm invention's hybrid system operates on the measured variables so as to produce the position and force variables that need to be controlled; whereas in Raibert and Craig, a selection matrix and its complement are used after formulation of tracking errors. In summary, the Raibert and Craig disclosure simply does not teach or suggest the novel concepts of my invention.

SUMMARY OF THE INVENTION

My invention of the parent application ("single-arm" invention) discloses a novel method and apparatus for the design of adaptive force and position controllers within a hybrid control architecture. The hybrid controller includes an adaptive force controller which achieves tracking of desired force setpoints, and an adaptive position controller which accomplishes tracking of desired position trajectories. Force and position controller gains are varied by novel adaptation laws. These controllers are computationally fast and suitable for on-line implementation with high sampling rates and such adaptive gains are implemented in feedback and feedforward controllers. These controllers are capable of compensating for dynamic cross-couplings that exist between position and force control loops.

A key feature of my single-arm invention is that my adaptive hybrid controller architecture does not require knowledge of the complex dynamic model or parameter values of the manipulator or the environment. The force and position controllers are linear and stable and generate real-time signals which vary and compensate for system non-linearities in order to achieve a desired position/force response.

An additionally attractive feature of my single-arm adaptive controllers is an ability to compensate for dynamic cross-couplings that exist between the position and force control loops in the hybrid control architecture. Furthermore, the adaptive force and position controllers have "learning capabilities" to cope with unpredictable changes in the manipulator or environment parameters such as environment or robotic arm stiffness. This is due to the fact that the controller gains are adapted rapidly on the basis of the manipulator's Cartesian space performance. Low computational requirements make the control loops of the single-arm invention suitable for implementation in on-line hybrid control with high sampling rates.

The described and improved multi-arm invention of this application presents three strategies for adaptive control of cooperative dual-arm robots. In the position-position control strategy, the adaptive controllers ensure that the end-effector positions of both arms track desired trajectories in Cartesian space despite unknown time-varying interaction forces exerted through the load. In the position-hybrid control strategy, the adaptive controller of one arm controls end-effector motions in the free directions and applied forces in the constraint directions; while the adaptive controller of the other arm ensures that the end-effector tracks desired position trajectories. In the hybrid-hybrid control strategy, the adaptive controllers ensure that both end-effectors track reference position trajectories while simultaneously applying desired forces on the load.

In all three control strategies, the cross-coupling effects between the arms are treated as "disturbances" which are rejected, or compensated for, by the adaptive controllers while following desired commands in a common frame of reference. The adaptive controllers do not require the complex mathematical model of the arm dynamics or any knowledge of the arm dynamic parameters or the load parameters such as mass and stiffness. The controllers have simple structures and are computationally fast for on-line implementation with high sampling rates. Simulation results are given to illustrate the proposed adaptive control strategies.

DESCRIPTION OF THE PREFERRED EMBODIMENT

The description of the invention claimed in this application will first include a summary of the novel single-arm force and position control laws and then those laws will be developed and applied to a multi-arm system of this invention. Incorporated herein by reference, in accordance with § 608.01(p) of the Manual of Patent Examining Procedure, from the above-identified single-arm application, is the mathematical formulation of the adaptive force and/or position control laws as set forth in section 1.1, page 10 through section 3, page 28. More particularly such incorporation includes Equations (21) through (24) for the gains of the PID controller of FIG. 3 hereof in the implementation of the linear adaptive force control law given by Equations (25) and (26): and likewise the formulation and implementation of the linear adaptive position control law of Equation (37) and the controller gains of Equations (38) through (43).

To avoid confusion, the Equations of this continuation-in-part application are numbered starting with Equation no. 101, etc. The exact same force and position control laws apply to multi-arm hybrid adaptive control as apply to single-arm hybrid adaptive control except the mathematical notation is changed slightly. It will be readily apparent to those of ordinary skill in this art, however, that the Equations are the same and one of the keys to the inventive features of this application is noting that the cross-coupling terms, $C_p$, Equation (25) and $C_f$ Equation (37) in the adaptive position and force loops of a single-arm system, also compensates for the cross-coupling that the independently controlled arm of one controller introduces into another independently controlled arm in a dual or higher-numbered multi-arm system. Stated in a slightly different way the cross-coupling term which results from an environment in the single-arm disclosure is replaced by the coupling through the load that is being held by a second arm in the multi-arm disclosure. Otherwise, the two systems are the same and the analysis for one system is fully and completely applicable to the other system.

Figure 6:
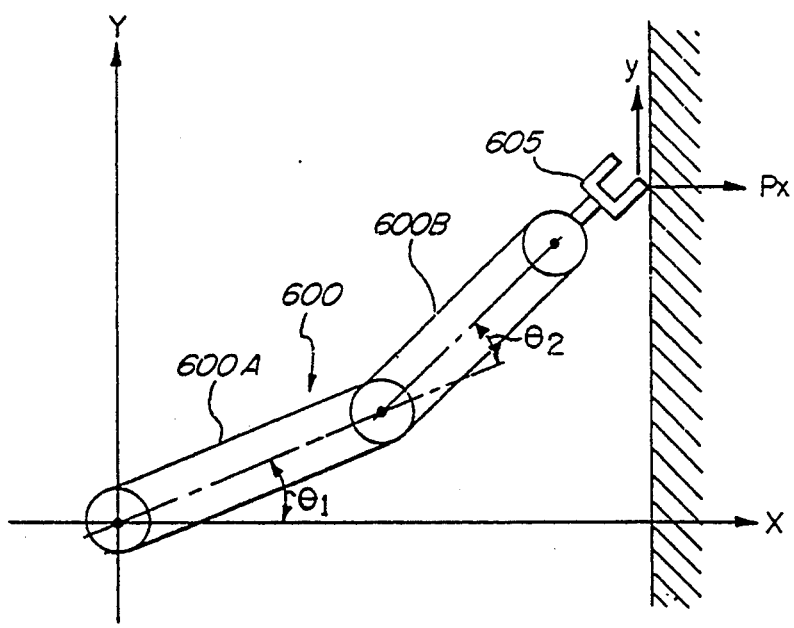
FIGS. 6 and 7 depict, respectively a single-arm and a cooperative dual-arm manipulator.
Figure 7:
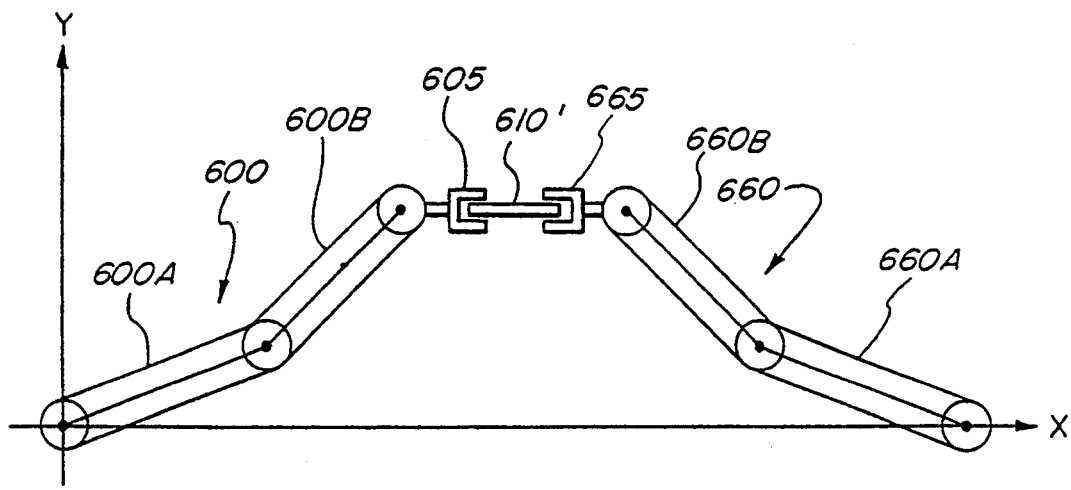

The blanket generality noted above may be appreciated by a brief reference to FIG. 6 in comparison to FIG. 7. FIG. 6 depicts a common way of showing a robot manipulator 600 having at least two joint-connected sections 600A, 600B and an end effector 605. The manipulator 600's end-effector 605 is moveable in a Cartesian space 630 and may come into contact with another object or a wall, such as environment 610. In FIG. 7, two arms 600 and 660 are shown and the environment in this instance is replaced by common load 610' that is being manipulated by and between the two arms, 600 and 660, respectively.

In order to show the correspondence with my earlier invention, I have identified the common load by number 610' so that its correspondence to the wall, or other object 610 will be more readily apparent. Although not depicted, common reference systems, independent controllers with synchronization at the trajectory generator level and common coordination (at the INTERMEDIATE LEVEL, FIG. 5) is to be understood throughout the disclosure as will become readily apparent by the following detailed description.

The presentation of the detailed description given hereinafter in this application is structured as follows. In Section 1 ("position-position"), the position-position control strategy is discussed and documented by simulation results. In Section 2 ("position-hybrid"), the position-hybrid, eg. position-force control strategy is developed and demonstrated by a numerical example. The hybrid-hybrid, force/position, or vice-versa, control strategy is addressed in Section 3 ("hybrid-hybrid") and an illustrative example is given. The remainder of this application discusses the results of the foregoing multi-arm presentation and draws some conclusions.

SECTION 1—POSITION-POSITION

Figure 1:
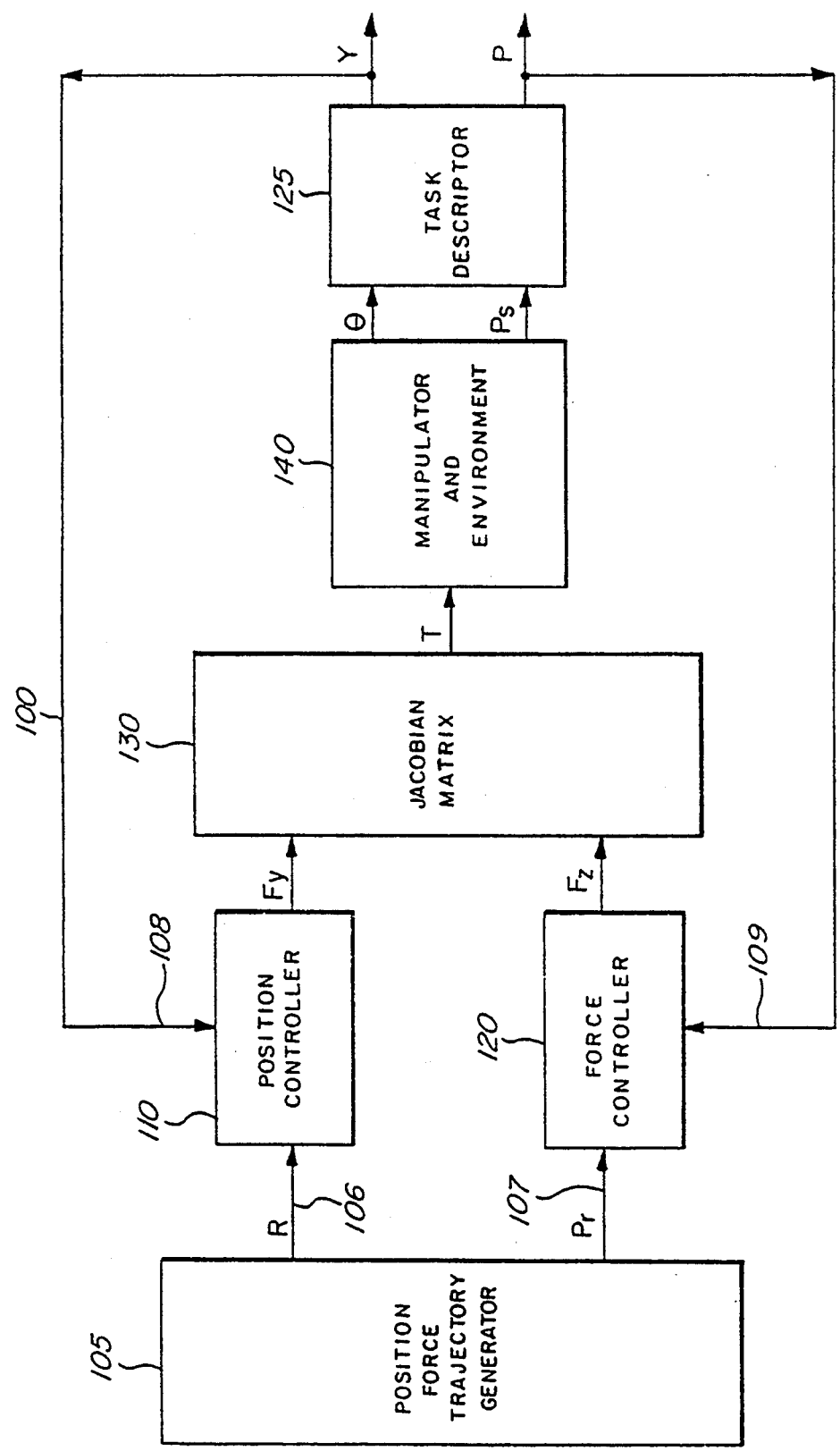
FIG. 1 depicts a block diagram of an improved hybrid control architecture in keeping with this invention.
Figure 2:
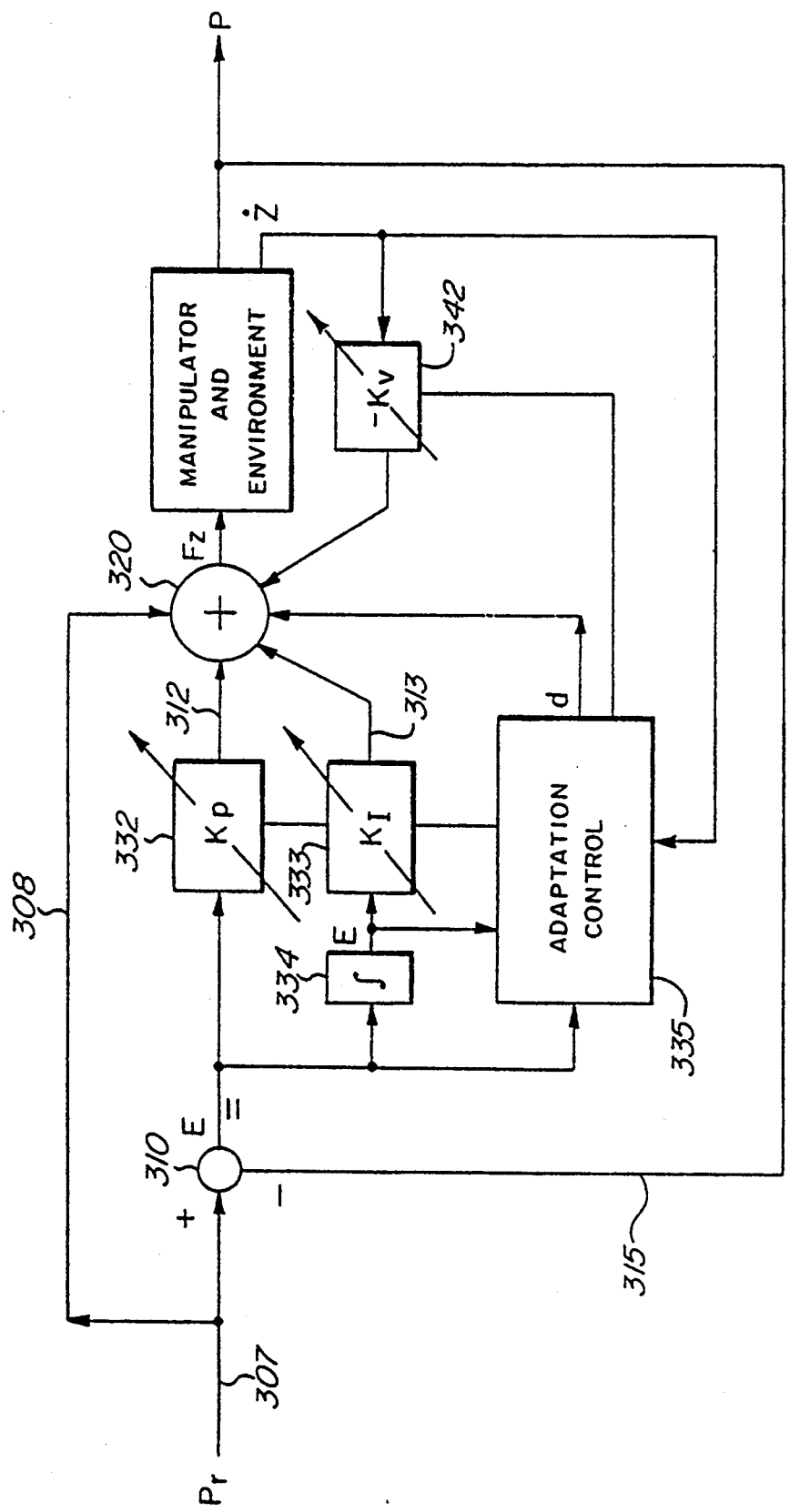
FIG. 2 is a simplified block diagram of a controller for performing adaptive force control in accordance with the invention.

In this section, we shall investigate the first control strategy for dual-arm manipulators in which both arms are in pure position control, as shown in FIG. 2. In other words, the positions and orientations of both end-effectors are required to track desired trajectories in a common frame of reference. In this situation, uncontrolled forces and torques will be exerted on the common load 610' held by the end-effectors 605,665 of the dual arms such as those represented in the LOW LEVEL section of FIG. 5. Investigated herein is the performance of the adaptive position control law of my system in the face of the interaction forces and torques exerted through the load 610'.

The dynamic model of each manipulator arm (arm 600 or 660, FIG. 7) can be represented by a differential equation in Cartesian space as was observed by O. Khatib, in *Dynamic Control of Manipulators in Cartesian Space*, Proc. 6th IFToMM Congress on Theory of Machines and Mechanisms, pp. 1128–1131, New Delhi, India, 1983.

$$M(X)\ddot{X}+N(X,\dot{X})+G(X)+H(\dot{X})\pm f=F \quad (101)$$

where the above terms are defined as:
$X,\dot{X},\ddot{X}=n\times 1$ vectors of end-effector position, velocity and acceleration in a fixed task-related Cartesian frame of reference
$F=n\times 1$ vector of "virtual" Cartesian forces applied to the end-effector as the control input
$M(X)=n\times n$ symmetric positive-definite Cartesian mass matrix
$N(X,\dot{X})=n\times 1$ Cartesian Coriolis and centrifugal force vector
$G(X)=n\times 1$ Cartesian gravity loading vector
$H(\dot{X})=n\times 1$ Cartesian friction force vector
$f=N\times 1$ vector of forces and torques exerted by the end-effector on the load.

Figure 5:
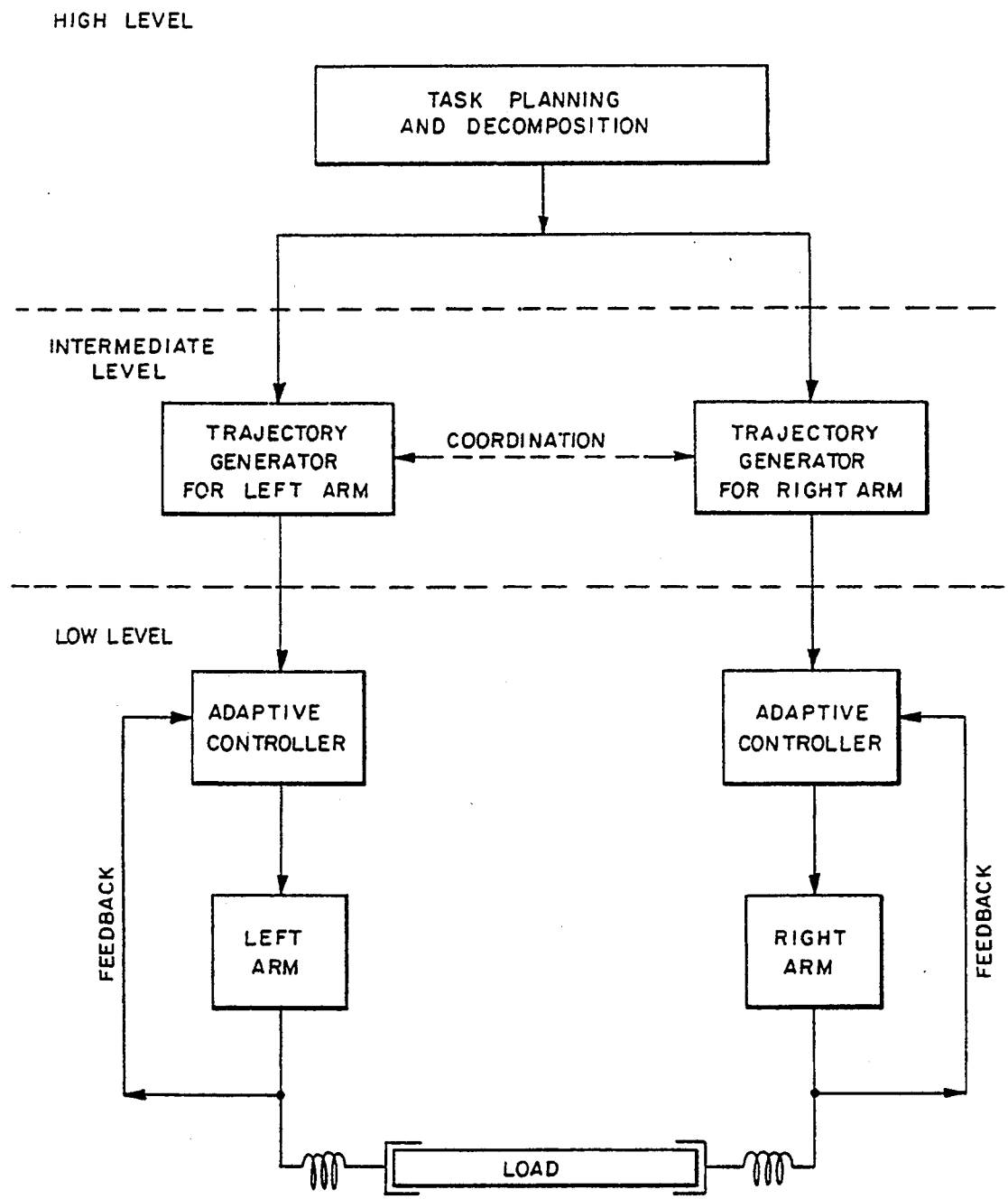
FIG. 5 depicts a tri-level hierarchal control for two, or higher-numbered arm, robotic systems.

In the above-noted example the load is the shared common load 610' between the dual-arm system of FIGS. 5 and 7.

Figure 3:
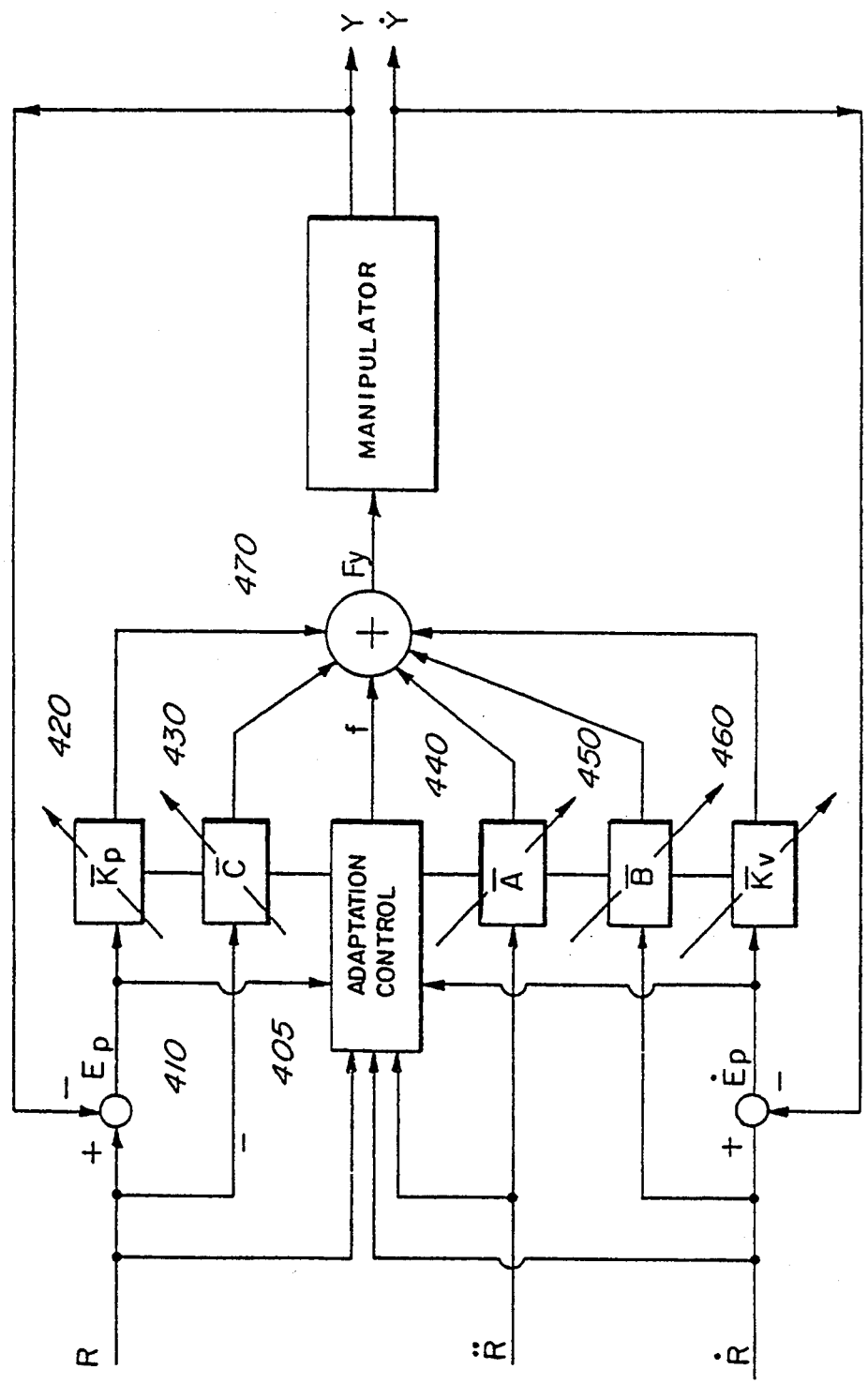
FIG. 3 is a simplified block diagram of a controller for performing adaptive position control in accordance with the invention.
Figure 4:
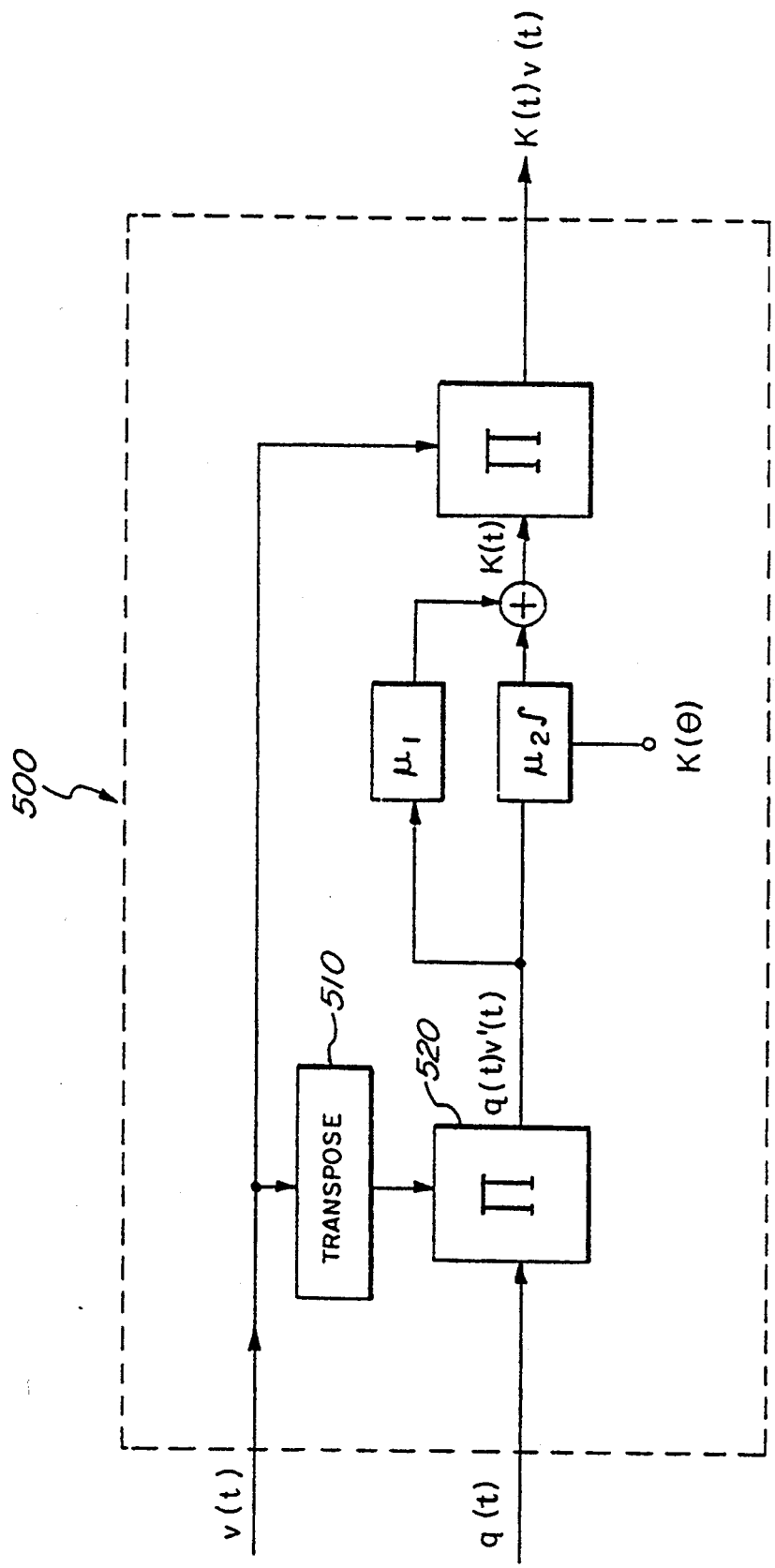
FIG. 4 is a block diagram of a basic module which is repeated as necessary for implementation of the controller functions of adaptive force and position control in accordance with this invention.

The force/torque vector f both imparts motion to and applies force/torque on the load 610' and acts as the coupling element between the two arms 600 and 660. In the following analysis, the force/torque vector f will be considered as a "disturbance input" (analogous to my earlier-described auxiliary input signal d(t), $C_p$ and $C_f$) to the position control system. The function of the control system is to ensure that the end-effector position vector X tracks the $n\times 1$ vector of desired trajectory $X_d$ despite the disturbance force f. For each manipulator arm, let us apply the linear adaptive position control law described in my earlier application or it's corresponding paper which is identified as H. Seraji, *Direct Adaptive Control of Manipulators in Cartesian Space*, Journal of Robotic Systems, February, 1987. Such a position control law is:

$$F(t)=d(t)+[K_p(t)E(t)+K_v(t)\dot{E}(t)]+[C(t)X_d(t)+B(t)\dot{X}_d(t)+A(t)\ddot{X}_d(t)] \quad (102)$$

as shown in FIG. 3, where $E(t)=X_d(t)-X(t)$ is the $n\times 1$ position tracking-error vector. In the control law (102), the $n\times 1$ vector d(t) is an auxiliary signal to be synthesized by the adaption scheme, while $[K_pE+K_v\dot{E}]$ and $[CX_d+B\dot{X}_d+A\ddot{X}_d]$ are the contributions due to the feedback and feedforward controllers respectively. Following my earlier-described method, the required auxiliary signal and controller gains are updated according to the following adaptation laws:

$$d(t) = d(0) + \delta_1 \int_0^t r(t)dt + \delta_2 r(t) \quad (103)$$

$$K_p(t) = K_p(0) + \alpha_1 \int_0^t r(t)E'(t)dt + \alpha_2 r(t)E'(t) \quad (104)$$

$$K_v(t) = K_v(0) + \beta_1 \int_0^t r(t)\dot{E}'(t)dt + \beta_2 r(t)\dot{E}'(t) \quad (105)$$

$$C(t) = C(0) + \nu_1 \int_0^t r(t)X_d'(t)dt + \nu_2 r(t)X_d'(t) \quad (106)$$

$$B(t) = B(0) + \gamma_1 \int_0^t r(t)\dot{X}_d'(t)dt + \gamma_2 r(t)\dot{X}_d'(t) \quad (107)$$

$$A(t) = A(0) + \lambda_1 \int_0^t r(t)\ddot{X}_d'(t)dt + \lambda_2 r(t)\ddot{X}_d'(t) \quad (108)$$

where
$$r(t) = W_p E(t) + W_v \dot{E}(t) \quad (109)$$

in an n×1 vector, $\{\delta_1, \alpha_1, \beta_1, \nu_1, \gamma_1, \lambda_1\}$ are positive scalars, $\{\delta_2, \alpha_2, \beta_2, \nu_2, \gamma_2, \lambda_2\}$ are positive or zero scalars, and the prime denotes transposition. In equation (109), $W_p$ and $W_v$ are n×n constant weighing matrices chosen by the designer to reflect the relative significance of the position and velocity errors E and E. It must be noted that since we cannot physically apply the Cartesian control force F to the end-effector, we instead compute the n×1 equivalent joint torque vector T to effectively cause this force. Thus, for each manipulator arm (arm 600 or 660, FIG. 7, for example), the control law in joint space is given by $$T(t)=J'(\theta)F(t)=J'(\theta)\{d(t)+K_p(t)E(t)+K_v(t)\dot{E}(t)+\\ C(t)X_d(t)+B(t)\dot{X}_d(t)+A(t)\ddot{X}_d(t)\} \quad (110)$$

where $\theta$ is the n×1 vector of joint angular positions and $J(\theta)$ is the n×n Jacobian matrix of the manipulator arm.

Because of the simplicity of the adaptation laws (103) through (108), the robot control algorithm can be implemented using high sampling rates (typically 1 KHz). In each sampling period (~1 msec), the controller gains can change significantly; whereas the terms M, N, G, H, and f in the robot model (101) cannot change noticeably. As a result, in deriving equations (103) through (108), it was assumed that these terms are unknown and "slowly time-varying" relative to the gain variations as such are changed by these adaptation laws. It is seen that the inclusion of the disturbance force f in the robot model (101) does not affect the controller adaptation laws since the change in f over one sampling period is relatively small.

The above-noted observation likewise suggests that when both manipulator arms are controlled using the two independent adaptive position controllers as implemented by my adaptation laws, we observe that the end-effectors will track the desired position trajectories despite the interaction forces and torques exerted through the load. It must be noted that since the force on the load is not controlled variable in this invention, this strategy can lead to undesirable load forces when the position trajectories are not planned in coordination or are not tracked closely. The position-position control strategy is illustrated by the following example.

Consider the planar dual-arm manipulator in a horizontal plane (g=0) shown in FIG. 7, where the two arms 600 and 660 are identical and each arm has two links and an end-effector with negligible inertia. Suppose that the load is a linear spring of natural length $l_o$ and coefficient of stiffness (elasticity) $K_o$. In the joint space, the dynamic equations of motion for each arm which relates the joint torque vector $$T = \begin{pmatrix} T_1 \\ T_2 \end{pmatrix}$$

to the joint angle vector $$\theta = \begin{pmatrix} \theta_1 \\ \theta_2 \end{pmatrix}$$

is given by H. Seraji, et al., *Linear Multivariable Control of Two-Link Robots*, Journal of Robotic Systems, pp. 349–365, Vol. 3, No. 4, 1986 as follows $$T(t)=M(\theta)\ddot{\theta}+N(\theta,\dot{\theta})+H(\dot{\theta})\pm J'(\theta)f \quad (111)$$

where the above terms are defined as:

Inertia matrix $$M(\theta) = \begin{pmatrix} a_1 + a_2\cos\theta_2 & a_3(a_2/2)\cos\theta_2 \\ a_3 + (a_2/2)\cos\theta_2 & a_3 \end{pmatrix}$$

Coriolis and centrifugal torque vector $$N\left(\theta,\dot{\theta}\right) = \begin{pmatrix} -(a_2\sin\theta_2)(\dot{\theta}_1\dot{\theta}_2 + \dot{\theta}_1/2) \\ (a_2\sin\theta_2)\dot{\theta}_1^2/2 \end{pmatrix}$$

Coulomb and viscous friction torque vector $$H(\dot{\theta}) = \begin{pmatrix} V_1\dot{\theta}_1 + V_2\text{sgn}(\dot{\theta}_1) \\ V_3\dot{\theta}_2 + V_4\text{sgn}(\dot{\theta}_2) \end{pmatrix}$$

Jacobian matrix $$J(\theta) = \begin{pmatrix} -l_1\sin\theta_1 - l_2\sin(\theta_1 + \theta_2) & -l_2\sin(\theta_1 + \theta_2) \\ l_1\cos\theta_1 + l_2\cos(\theta_1 + \theta_2) & l_2\cos(\theta_1 + \theta_2) \end{pmatrix}$$

In the above expressions, $a_1, \ldots, a_5$ are constant parameters obtained from the masses $\{m_1, m_2\}$ and the lengths $\{l_1, l_2\}$ of the links, $\{v_1, v_3\}$ and $\{v_2, v_4\}$ are coefficients of viscous and Coulomb frictions respectively, and the links are uniform with centers-of-gravity located at mid-lengths. The interaction force vector f is modelled as $$f = \begin{pmatrix} f_x \\ f_y \end{pmatrix} = \begin{pmatrix} K_o(l - l_o)\cos\alpha \\ K_o(l - l_o)\sin\alpha \end{pmatrix}$$

where $l=\sqrt{(x_2-x_1)^2+(y_2-y_1)^2}$ is the instantaneous length of the coordinates of each end-effector given by $$x=d_0+l_1\cos\theta_1+l_2(\theta_1+\theta_2)$$

$$y=l_1\sin\theta_1+l_2\sin(\theta_1+\theta_2)$$

and $d_0$ is the base distance from the origin and $\alpha$ is the angle between the spring and the x-axis, that is $$\tan\alpha = \frac{y_2 - y_1}{x_2 - x_1}.$$

The mass of the spring is assumed to be negligible compared to the masses of the links and hence the force in the spring dominates over the inertial force required to move the spring.

For the particular system under study, the numerical values of the parameters are chosen as $m_1 = 15.91$ kg; $m_2 = 11.36$ kg; $l_1 = l_2 = -0.432$ .m $V_1 = 6.0$Nt.m/rad.sec$^{-1}$, $V_3 = 4.0$Nt.m/rad.sec$^{-1}$ $V_2 = V_4 = 1.0$Nt.m; $K_0 = 1000.0$Nt./m The natural length of the spring is set equal to the initial distance between the end-effectors; i.e. $l_0 \sqrt{(x_{2i}-x_{li})^2 + (y_{2i}-y_{li})^2}$ so that there will be no initial force in the spring. The masses and lengths of the links are those of links 2 and 3 of the Unimation PUMA 560 arm. It must be emphasized that the mathematical model and the parameter values of the arms and the spring are used merely to simulate the system behavior and are not used to generate the control action. This invention does not depend upon knowledge of the complex mathematical model of the arm dynamics or any knowledge of the arm dynamic parameters or the load parameters such as mass or stiffness. As was noted hereinbefore, the lack of requirement of such knowledge must be acknowledged as being one of the key features that contributes to the simplified nature of this adaptive hybrid system invention and its novel force and/or position control laws, or algorithms.

Suppose that the end-effector of the right arm is required to track the desired position trajectories $x_{rd}(t) = 0.864[1 + 3\exp(-t/0.3) - 4\exp(-t/0.4)]$m.

$y_{rd}(t) = 0.864[3\exp(-t/0.3) - 4\exp(-t/0.4)]$m.

to move from the initial point $\{0,0,-0.864\}$ to the final point $\{0.864, 0.0\}$ on the straight line $Y_{rd}(t) = X_{rd}(t) - 0.864$. The end-effector of the left arm is required to track the desired position trajectories $x_{ld}(t) = 2.0 + 0.432[1 + 3\exp(-t/0.3) - 4\exp(-t/0.4)]$m.

$y_{ld}(t) = 0.432[-1 + 3\exp(-t/0.3) - 4\exp(-t/0.4)]$m.

to move from the initial point $\{2.0, -0.864\}$ to the final point $\{2.432, -0.432\}$ on the straight line $y_{ld}(t) = x_{ld}(t) - 2.864$. In this physical set-up the bases of the two arms are 2.0 meters apart, and the desired position trajectories for the right and left arms were chosen such that appreciable forces were created in the spring.

The two arms, in accordance with my invention, are controlled by identical and independent adaptive position control laws given by $$T(t) = J'(\theta)\{d(t) + K_p(t)E(t) + K_v(t)\dot{E}(t) + C(t)X_d(t) + B(t)\dot{X}_d(t) + A(t)\ddot{X}_d(t)\} \quad (112)$$

where $E(t) = X_d(t) - X(t)$ is the position tracking-error, $X(t) = [x(t), y(t)]'$, and $X_d(t) = [x_d(t), y_d(t)]'$. For both arms, the terms in the control law (112) are adapted as follows:

$$d(t) = 0.5r(t) + 0.5\int_0^t r(t)dt$$

$$K_p(t) = 2\int_0^t r(t)E'(t)dt$$

$$K_v(t) = 2\int_0^t r(t)\dot{E}'(t)dt$$

$$C(t) = 0.5\int_0^t r(t)X_d'(t)dt$$

$$B(t) = 0.5\int_0^t r(t)\dot{X}_d'(t)dt$$

$$A(t) = 0.5\int_0^t r(t)\ddot{X}_d'(t)dt$$

where
$r(t) = 8000E(t) + 800\dot{E}(t)$

Note that the initial values of the controller terms are all chosen arbitrarily as zero. A simple trapezoidal rule is used to compute the integrals in the adaptation laws with $dt = 1$ msec.

Figure 9A:
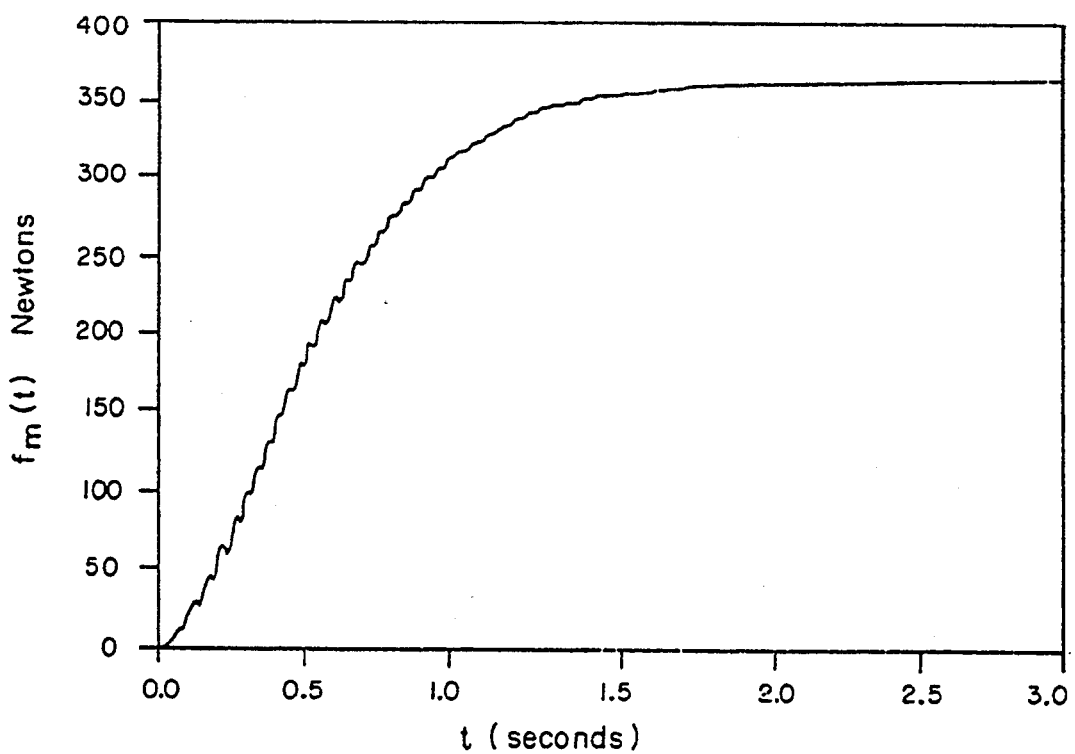
FIGS. 9$a$, 9$b$, 9$c$, 9$d$, 9$e$ and 9$f$, depict the results of a computer simulation in adaptive position tracking which are useful in performance evaluation of the invention.
Figure 9B:
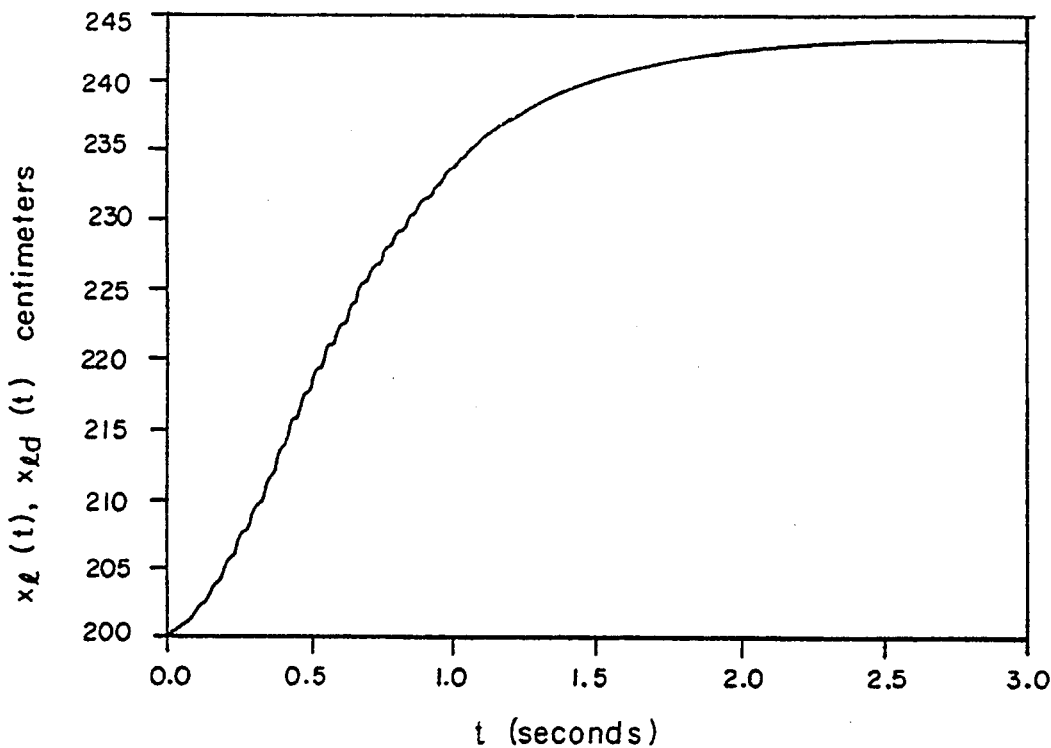
Figure 9C:
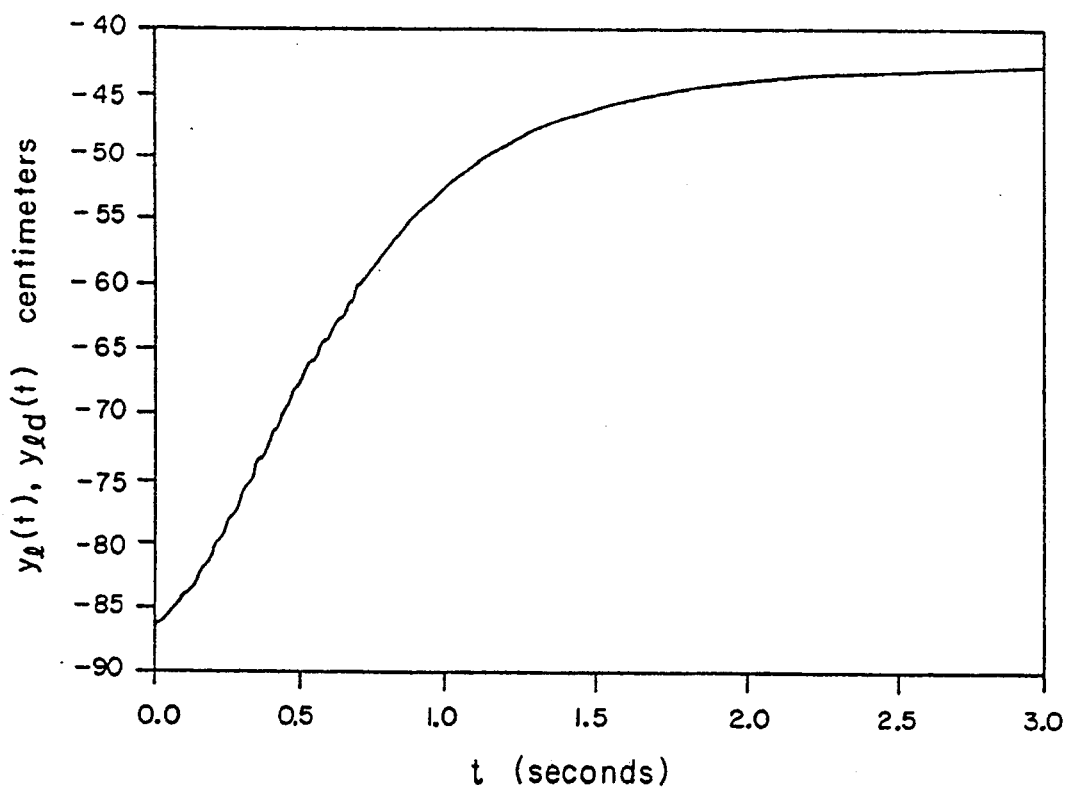
Figure 9D:
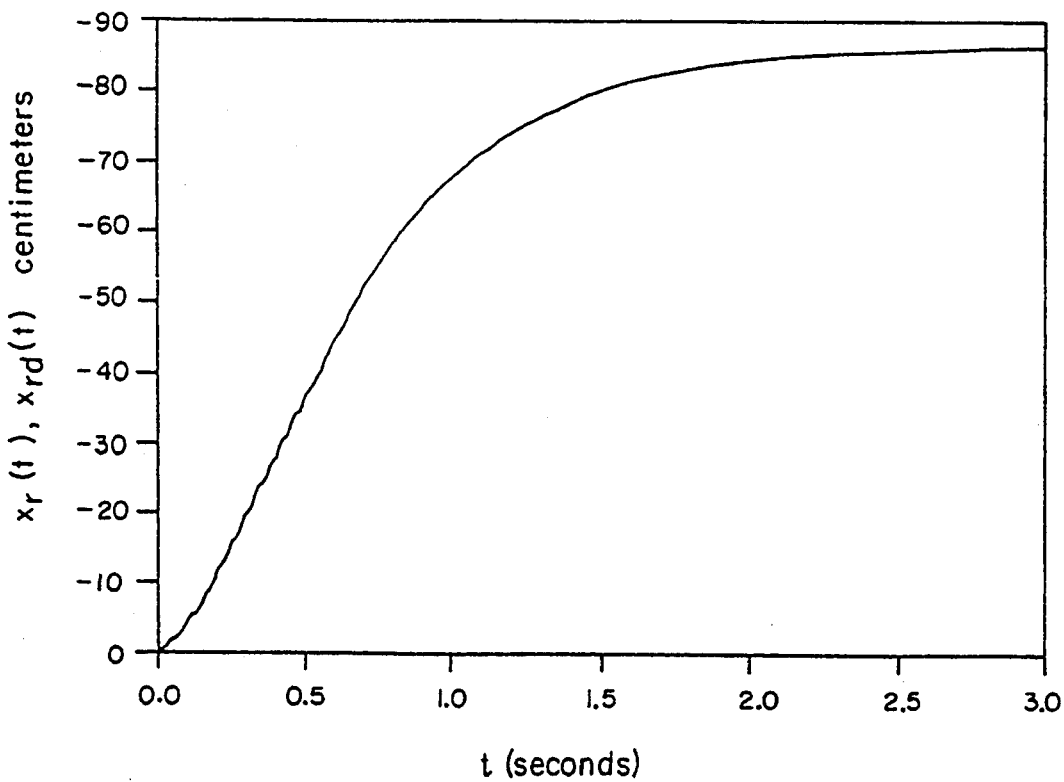
Figure 9E:
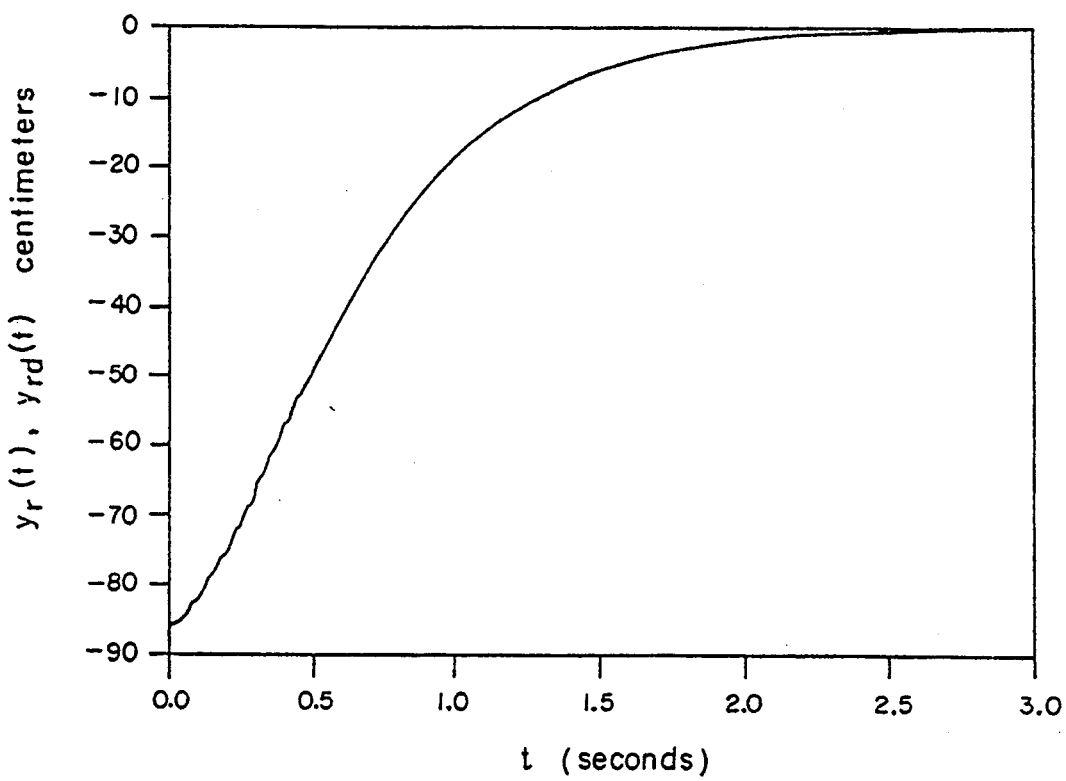
Figure 9F:
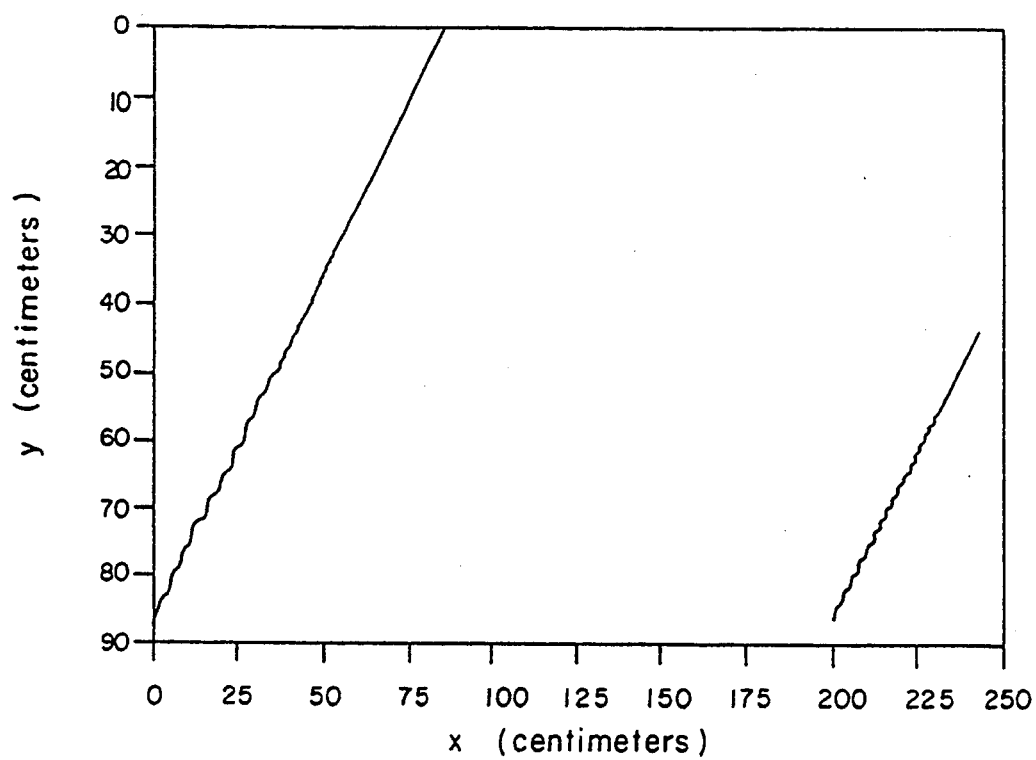

To evaluate the performance of the position-position control strategy, the nonlinear dynamic models of the arms (Equation 111) and the linear adaptive control laws (Equation 112) are simulated on a DEC-VAX 11/750 computer with the sampling period of 1 msec. The results of this simulation are shown in FIGS. 9(a) through 9(f). FIG. 9(a) shows the magnitude of the interaction force $f_m = \sqrt{f_x^2 + f_y^2}$ acting on the end-effectors through the spring. It is seen that $f_m$ changes from the initial value of zero to the final value of 373 Newtons in 2 seconds. FIGS. 9(b) through 9(e) show that the end-effector coordinates x(t) and y(t) of both arms track their corresponding reference trajectories $x_d(t)$ and $y_d(t)$ very closely despite the large interaction force $f_m$. The paths followed by the end-effectors in the horizontal plane are shown in FIG. 9(f). Note that both end-effectors track the straight lines as desired.

We conclude that the adaptive controller for each arm performs remarkably well in faithful position tracking despite very large unknown and time-varying interaction forces between the arms.

SECTION 2—POSITION-HYBRID

In this section, the position-hybrid control strategy for dual-arm manipulators will be studied in which the left arm is in pure position control and the right arm is in hybrid position/force control, as shown in one embodiment of FIG. 3. In other words, for the left arm 600, FIG. 7, the end-effector position is required to track a desired trajectory in a frame of reference. For the right arm 660, FIG. 7, in the same reference frame, the contact force between it's end-effector 665 and the load 610' must be controlled in the directions constrained by the load 610', while the end-effector 665's position is to be controlled simultaneously in the free directions. This control strategy is also applicable when one robot arm is confined for operation only in a position control mode whereas, simultaneously, the other arm can be controlled in hybrid control mode.

For the left arm 600, the interaction forces and torques exerted through the load 610' are considered as "disturbances," and the adaptive position control system can ensure tracking of the desired position trajectories despite such disturbances, as outlined in Section 1. The adaptive position control law for the left arm shown in FIG. 7 is given by Equation (37) in my earlier application and may be applied here as $$T_l(t) = J_l(\theta_l)\{\bar{d}(t) + \bar{K}_p(t)E(t) + \bar{K}_v(t)\dot{E}(t) + \bar{C}(t)X_{ld}(t) + \bar{B}(t)\dot{X}_{ld}(t) + \bar{A}(t)\ddot{X}_{ld}(t)\} \quad (113)$$

where $T_l$ is the $n \times 1$ joint torque vector, $\theta_l$ is the $n \times 1$ joint angle vector, $J_l(\theta_l)$ is the $n \times n$ Jacobian matrix, $X_{ld}(t) - X(t)$ is the $n \times 1$ position tracking-error vector and the terms in Equation (113) are adapted as follows:

$$\bar{d}(t) = \bar{d}(0) + \delta_1 \int_0^t r(t)dt + \delta_2 r(t) \quad (114)$$

$$\bar{K}_p(t) = \bar{K}_p(0) + \alpha_1 \int_0^t r(t)E'(t)dt + \alpha_2 r(t)E'(t) \quad (115)$$

$$\bar{K}_v(t) = \bar{K}_v(0) + \beta_1 \int_0^t r(t)\dot{E}'(t)dt + \beta_2 r(t)\dot{E}'(t) \quad (116)$$

$$\bar{C}(t) = \bar{C}(0) + \nu_1 \int_0^t r(t)X_{ld}'(t)dt + \nu_2 r(t)X_{ld}'(t) \quad (117)$$

$$\bar{B}(t) = \bar{B}(0) + \gamma_1 \int_0^t r(t)\dot{X}_{ld}'(t)dt + \gamma_2 r(t)\dot{X}_{ld}'(t) \quad (118)$$

$$\bar{A}(t) = \bar{A}(0) + \lambda_1 \int_0^t r(t)\ddot{X}_{ld}'(t)dt + \lambda_2 r(t)\ddot{X}_{ld}'(t) \quad (119)$$

where
$$r(t) = W_p E(t) + W_v \dot{E}(t) \quad (120)$$

and the symbols are defined in Section 1.

We shall now discuss the hybrid position/force controller for the right arm 660, FIG. 7. Consider a task-related "constraint frame" (coordinate system) which is defined by the particular contact situation occurring between the right end-effector 665 and the load 610'. In this frame, the n degrees-of-freedom (or directions) in the Cartesian space {X} can be partitioned into two orthogonal sets; the m constraint directions in subspace {Z} and the l free directions in subspace {Y}, with n=m+l. In the m constraint directions, the end-effector makes contact with the load 610' and the contact force needs to be controlled. In the l free directions, the end-effector is free to move and the end-effector position is to be controlled. In the hybrid control architecture (as noted in the aforesaid Raibert and Craig and Mason articles), two separate controllers may be employed for simultaneous force and position control. The "force controller" achieves tracking of desired force setpoints in the constraint directions; while the "position controller" accomplishes tracking of desired position trajectories in the free directions.

The dynamic model of the right arm in the constraint directions can be written as $$A(X,\dot{X})\ddot{F}(t) + B(X,\dot{X})\dot{F}(t) + P(t) + C_p(Y) \pm f_z = F_z(t) \quad (121)$$

where $F_z$ is the $m \times 1$ "virtual" Cartesian force vector applied to the end-effector in the constraint directions, Z is the $m \times 1$ vector of end-effector position, the $m \times m$ matrices A and B are highly complex nonlinear functions of the end-effector position X, $C_p$ is the cross-coupling from the position loop into the force loop and $f_z$ is the component of the force exerted on the end-effector by the load 610' in the constraint directions. The term $f_z$ represents the cross-coupling that exists between the arms 600,660 through the load 610' and is considered as a "disturbance" to the hybrid controller.

An adaptive force control scheme is developed within the hybrid control architecture as claimed herein. For the right arm, 660, the linear adaptive force control law in the constraint directions is given by Equation 122 below as $$F_z(t) = P_r(t) + d(t) + K_p(t)E(t) + K_I(t)\int_0^t E(t)dt - K_v(t)\dot{Z}(t) \quad (122)$$

where $P_r(t)$ is the desired contact force on the load 610' used as a feedforward term, d(t) is an auxiliary signal, $E(t) = P_r(t) - P(t)$ is the deviation of the actual force P(t) from the desired value, and $\{K_p(t), K_I(t), K_v(t)\}$ are adaptive gains of the PID controller. The terms in the force control law, Equation (122), are adapted as follows:

$$d(t) = d(0) + \delta_1 \int_0^t q(t)dt + \delta_2 q(t) \quad (123)$$

$$K_I(t) = K_I(0) + \alpha_1 \int_0^t q(t)E^*(t)dt + \alpha_2 q(t)E^*(t) \quad (124)$$

$$K_p(t) = K_p(0) + \beta_1 \int_0^t q(t)E'(t)dt + \beta_2 q(t)E'(t) \quad (125)$$

$$K_v(t) = K_v(0) + \gamma_1 \int_0^t q(t)\dot{Z}'(t)dt + \gamma_2 q(t)\dot{Z}'(t) \quad (126)$$

where
$$q(t) = W_I E^*(t) + W_p E(t) - W_v \dot{Z}(t) \quad (127)$$

In equations (123) through (127), $$E^*(t) = \int_0^t E(t)dt$$

is the integral error vector, $\{\delta_1, \alpha_1, \beta_1, \gamma_1\}$ are positive scalars, $\{\delta_2, \alpha_2, \beta_2, \gamma_2\}$ are positive or zero scalars, and $\{W_I, W_p, W_v\}$ are constant weighting matrices chosen by the designer to reflect the relative significance of $E^*$, E and Z.

The dynamic model of the right arm in the free directions can be written as $$A_o(X,\dot{X})\ddot{Y}(t) + B_o(X,\dot{X})\dot{Y}(t) + C_o(X,\dot{X})Y(t) + C_f(P) + f_y = F_y(t) \quad (128)$$

where $f_y$ is the component of the end-effector force in the free directions, $C_f$ is the cross-coupling from the force loop, $A_o$, $B_o$, $C_o$ are complex nonlinear matrices, Y is the end-effector position vector and $F_y$ is the "virtual" end-effector control force. For the right arm, the linear adaptive position control law in the free directions is given by $$F_y(t) = \bar{d}(t) + \bar{K}_p(t)E_p(t) + \bar{K}_v(t)\dot{E}_p(t) + \bar{C}(t)R(t) + \bar{B}(t)\dot{R}(t) + \bar{A}(t)\ddot{R}(t) \quad (129)$$

as in Section 2, where R is the desired position trajectory, $E_p = R - Y$ is the position tracking-error, and $F_y$ is the "virtual" Cartesian force in the free directions. Thus, in order to implement the force and position controllers in accordance with Equations (122) and (129) in the hybrid control architecture, the joint space control law for the right arm is given by $$T_r(t) = J_r'(\theta_r) \begin{pmatrix} F_z(t) \\ F_y(t) \end{pmatrix} \quad (130)$$

where $\theta_r$ is the joint angle vector, $T_r$ is the joint torque vector, and $J_r$ is the Jacobian matrix of the right arm with appropriate reordering of columns of $J_r$ if necessary.

The hybrid controller adaptation laws, Equations (103) through (108) and (123) through (126) are extremely simple, and therefore the control algorithm can be implemented using high sampling rates (rates ($\approx 1$ KHz); yielding improved performance particularly in force control applications. Since in each sampling period ($\approx 1$ m sec) the terms in the robot models (121) and (128) cannot change noticeably, it is reasonable to assume that these terms are "slowly time-varying" compared to the adaptation scheme. Thus the inclusion of the disturbance $f_z$ and $f_y$ in the robot models (121) and (128) does not effect the controller performance.

It is concluded, therefor, that using the position-hybrid control strategy, the left end-effector will track the desired position trajectory despite the interaction forces through the load. The right end-effector will exert the desired force on the load in certain directions while simultaneously tracking the desired position trajectory in the orthogonal directions. It must be noted that in this control strategy, slight fluctuations may be observed on the load force due to very small vibrations of the left arm under position control. The position-hybrid control strategy is now illustrated by the following example.

Let us consider the dual-arm manipulator discussed in Example 2 (with negligible friction) and suppose that the end-effectors carry a rigid load in a horizontal plane, as shown in FIG. 7. Suppose that the load 610', as shown, is initially parallel to the x-axis and we wish to make a parallel translation of the load 610' while the right arm, 660, applies a constant desired contact force on the load. This problem is similar to pulling out a drawer using two arms.

The x-component of the force on the load 610' can be written as $$f_x = k_o[(x_2 - x_1) - l_o] \quad (55)$$

where $(x_2 - x_1)$ is the distance between the end-effectors, $l_o$ is the length of the load, $K_o$ is the stiffness of force/torque sensors mounted on the end-effectors to measure the force $f_x$. The y-component of the force on the load is $$f_y = \frac{m}{2} \ddot{y}$$

where the arms are assumed to share the load equally; i.e. each arm "sees" the load mass as m/2. In the simulation, we take $K_o = 1000.0$ Nt/m and m=1.0 Kg.

Suppose that the end-effector 605 of the left arm 600 is required to track the desired position trajectories $$x_{ld}(t) = 0.432 \text{ meter}$$

$$y_{ld}(t) = 0.432[1 + 6 \exp(-t/0.3) - 8 \exp(-t/0.4)] \text{meter}$$

to move from the initial point {0.432, −0.432} to the final point {0.432, 0.432} on the vertical line $x_{ld}(t) = 0.432$. The end-effector 665 of the right arm 660 is required to apply a specified force setpoint $P_{rd}$ on the load 610' in the x direction and simultaneously track the desired position trajectory $y_{rd}(t)$ in the y-direction; where $$P_{rd} = 10 \text{ Newton}$$

$$y_{rd}(t) = 0.432[1 + 6 \exp(-t/0.3) - 8 \exp(-t/0.4)] \text{ meter}$$

so that the end-effector moves from the initial point {2.432, 0.432} to the final point {2.432, 0.432} on the vertical line $x_{rd}(t) = 2.432$, where 2.0 meter is the distance between the bases of the two arms.

The adaptive position control law for the left arm is given by $$T_l(t) = J'_l(\theta_l)\{\bar{d}(t) + \bar{K}_p(t)E(t) + \bar{K}_v(t)\dot{E}(t) + \bar{C}(t)X_{ld}(t) + \bar{B}(t)\dot{X}_{ld}(t) + \bar{A}(t)\ddot{X}_{ld}(t)\} \quad (131)$$

where $E(t) = X_{ld}(t) - X_l(t)$ is the position tracking-error, $X_l(t) = [x_l(t), y_l(t)]'$, $X_{ld}(t) = [X_{ld}(t), y_{ld}(t)]'$ and the terms in equation (131) are:

$$\bar{d}(t) = 0.5\bar{r}(t) + 0.5 \int_0^t \bar{r}(t)dt$$

$$\bar{K}_p(t) = 2 \int_0^t \bar{r}(t)E'(t)dt$$

$$\bar{K}_v(t) = 2 \int_0^t \bar{r}(t)\dot{E}'(t)dt$$

$$\bar{C}(t) = 0.5 \int_0^t \bar{r}(t)X'_{ld}(t)dt$$

$$\bar{B}(t) = 0.5 \int_0^t \bar{r}(t)\dot{X}'_{ld}(t)dt$$

$$\bar{A}(t) = 0.5 \int_0^t \bar{r}(t)\ddot{X}'_{ld}(t)dt$$

where $$\bar{r}(t) = 20000E(t) + 2000\dot{E}(t)$$

Note that the initial values of the controller terms are set to zero. The integrals in the control law (131) are computed using a simple trapezoidal rule with dt=0.5 msec.

The adaptive hybrid position/force control law for the right arm is given by $$T_r(t) = J'_r(\theta_r) \begin{pmatrix} F_x(t) \\ F_y(t) \end{pmatrix} \quad (132)$$

-continued where $$F_x(t) = P_{rd}(t) + d(t) + K_I(t)e_x^*(t) + K_p(t)e_x(t) - K_v(t)\dot{x}(t)$$

$$F_y(t) = \tilde{d}(t) + \tilde{K}_p(t)e_y(t) + \tilde{K}_v(t)\dot{e}_y(t) +$$

$$\tilde{C}(t)\dot{y}_r(t) + \tilde{B}(t)y_r(t) + \tilde{A}(t)\ddot{y}_r(t)$$

$$e_x(t) = P_{rd}(t) - P_{rx}(t) = \text{force tracking-error}$$

$$e_y(t) = y_{rd}(t) - y_r(t) = \text{position tracking-error}$$

$$e_x^*(t) = \int_0^t e_x(t)dt = \text{integral force error}$$

The adaptation laws for the force controller are:

$$d(t) = q(t) + \int_0^t q(t)dt$$

$$K_I(t) = 100 + 100 \int_0^t q(t)e_x^*(t)dt$$

$$K_p(t) = 100 + 10 \int_0^t q(t)e_x(t)dt$$

$$K_v(t) = 5000 - 40000 \int_0^t q(t)\dot{x}(t)dt$$

where $$q(t) = 10e_x(t) - 100\dot{x}(t) + 10e_x^*(t)$$

The adaptation laws for the position controller are:

$$\tilde{d}(t) = 0.5r(t) + 0.5 \int_0^t r(t)dt$$

$$\tilde{K}_p(t) = 2 \int_0^t r(t)e_y(t)dt$$

$$\tilde{K}_v(t) = 2 \int_0^t r(t)\dot{e}_y(t)dt$$

$$\tilde{C}(t) = 0.5 \int_0^t r(t)y_r(t)dt$$

$$\tilde{B}(t) = 0.5 \int_0^t r(t)\dot{y}_r(t)dt$$

$$\tilde{A}(t) = 0.5 \int_0^t r(t)\ddot{y}_r(t)dt$$

where $$r(t) = 1000e_y(t) + 500\dot{e}_y(t)$$

The integrals in the above adaptation laws are evaluated using the trapezoidal rule with dt=0.5 msec.

Figure 10A:
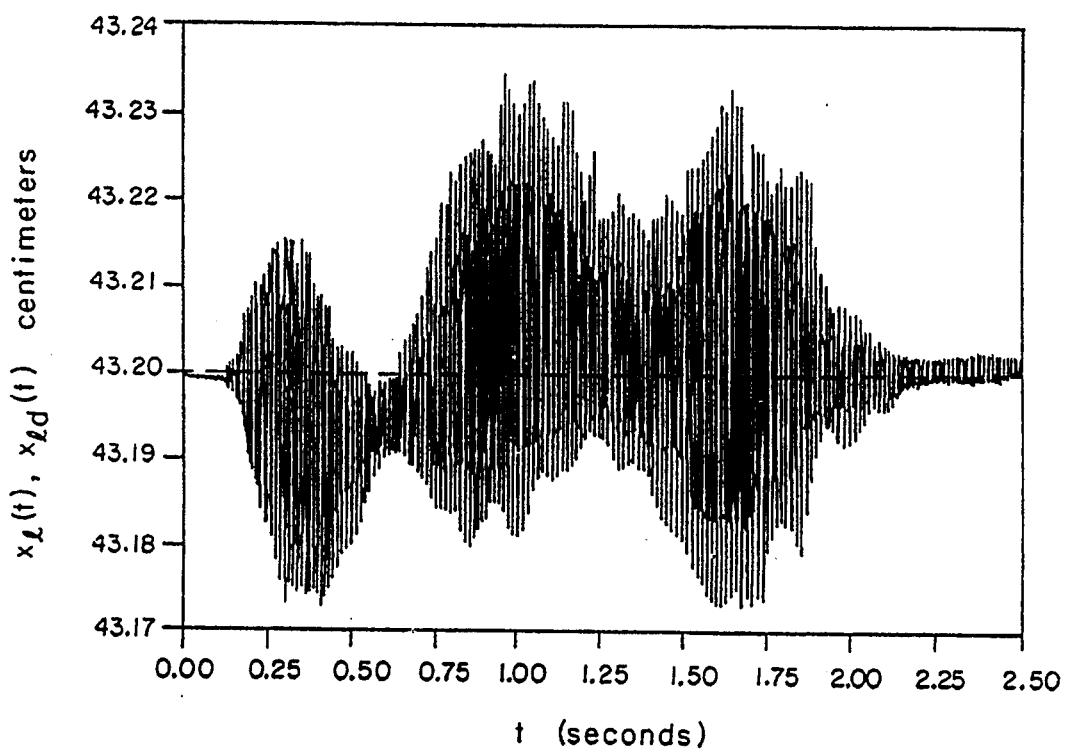
FIGS. 10$a$, 10$b$, 10$c$, 10$d$ and 10$e$, depict the results of a computer simulation in adaptive position-hybrid control which are useful in performance evaluation of the invention.
Figure 10B:
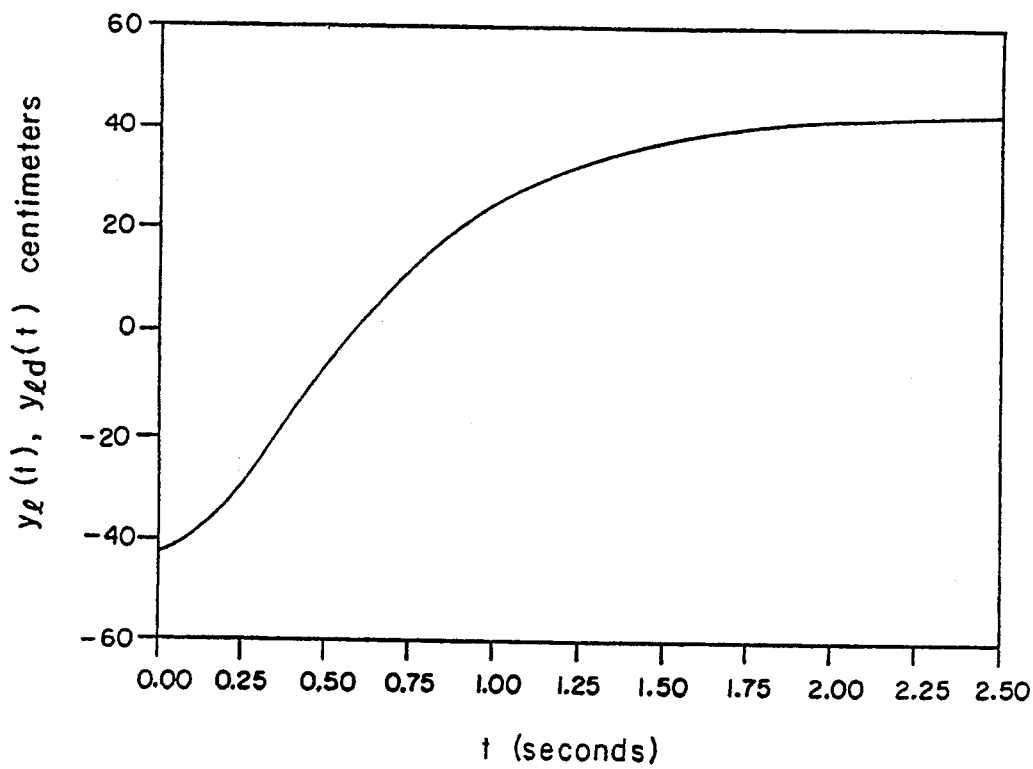
Figure 10C:
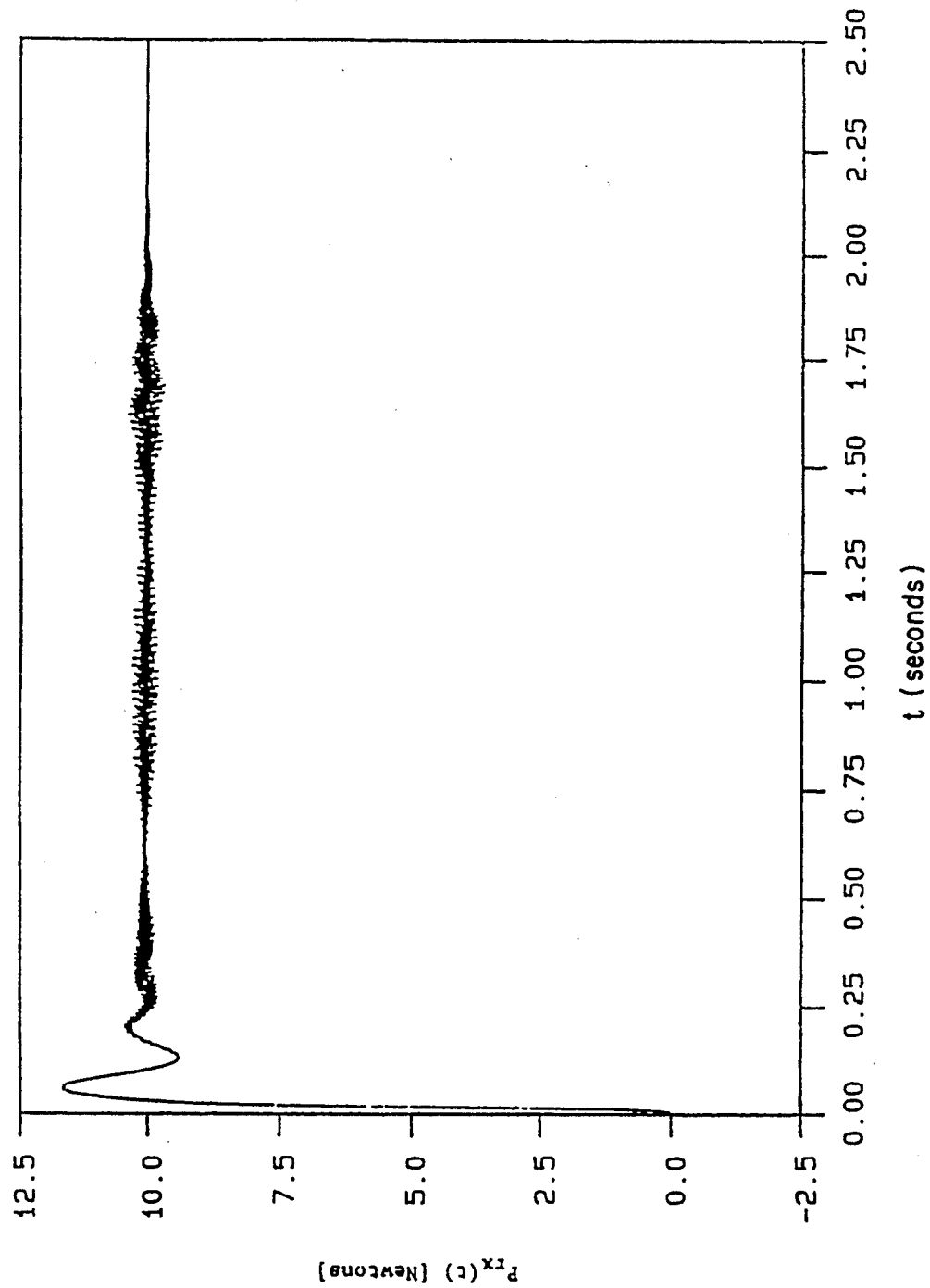
Figure 10D:
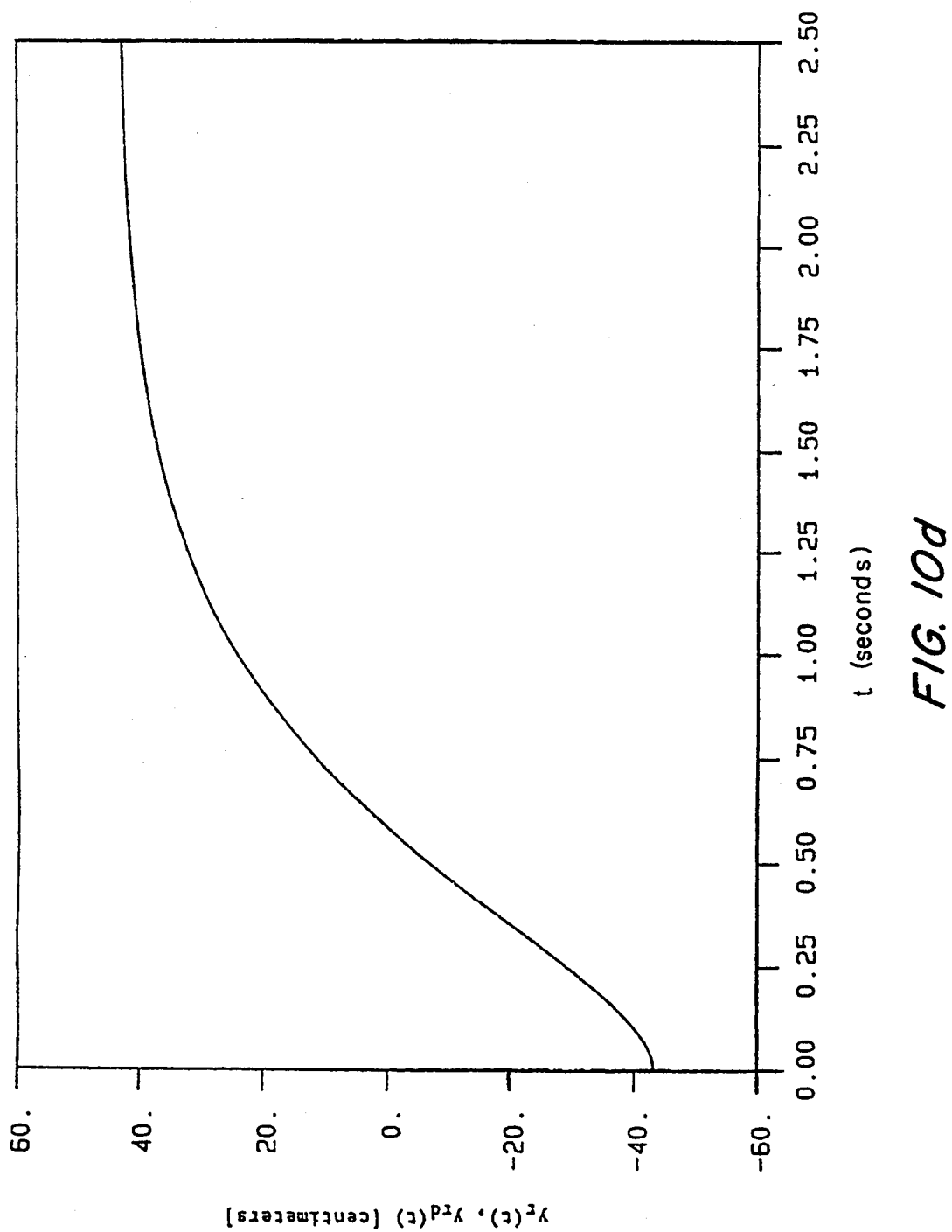
Figure 10E:
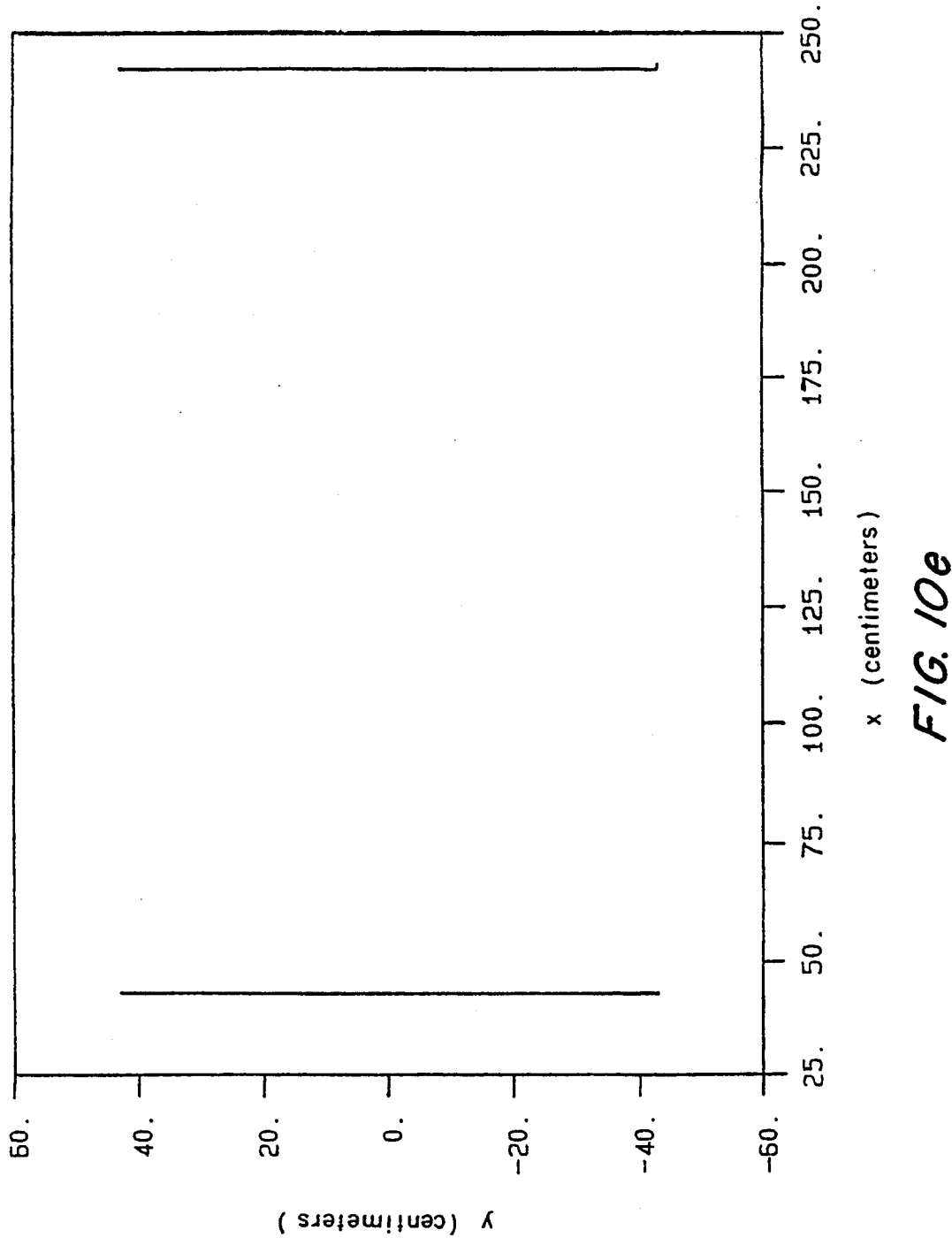

To evaluate the performance of the position-hybrid control strategy, the nonlinear dynamic models of the arms (Equation 111) and the linear adaptive control laws (Equations 131 through 132) are simulated on a DEC-VAX 11/750 computer with the sampling period of 0.5 msec and the simulation results are shown in FIGS. 10(a) through 10(b). These Figures show that the end-effector coordinates $x_l(t)$ and $y_l(t)$ of the left arm track the desired position trajectories $x_{ld}(t)$ and $y_{ld}(t)$ very closely. FIGS. 10(c) through 10(d) indicate that the right end-effector exerts the desired force of 10 Newtons on the load in the x-direction and tracks the desired position trajectory $y_{rd}(t)$ in the y-direction. Notice that the oscillations in the force response in FIG. 10(c) are due to the very small variations of the left end-effector x-coordinate as shown in FIG. 10(a). These oscillations can be reduced by increasing the gains of the position controller for the left arm. The paths traversed by the end-effectors in the horizontal plane are shown in FIG. 10(e). It is seen that the left end-effector tracks a vertical straight line, whereas the right end-effector moves in initially to produce the desired contact force and then tracks a vertical straight line. Thus, the adaptive position and hybrid controllers for each arm perform well in the dual-arm situation.

SECTION 3—HYBRID-HYBRID

In this section, the hybrid-hybrid control strategy for dual-arm manipulators will be studied in which both arms are in hybrid position/force control. In other words, in a common frame of reference for both arms, the forces exerted by the end-effectors on the load in the constraint directions $\{Z\}$ must be controlled; while simultaneously the end-effectors are required to track desired position trajectories in the free directions $\{Y\}$. Any unwanted forces and torques on the load generated by the relative position and orientation of the end-effectors will act as "disturbances" and the adaptive hybrid controllers ensure that the desired position/force trajectories are tracked despite such disturbances.

Following Section 2, for each manipulator arm the hybrid position/force control law in the joint space can be written as $$T(t) = J'(\theta) \begin{pmatrix} F_z(t) \\ F_y(t) \end{pmatrix} \tag{133}$$

where $J(\theta)$ is the Jacobian matrix (with appropriate column reordering if necessary), and $F_z(t)$ and $F_y(t)$ are the "virtual" Cartesian forces applied to the end-effector in the constraint directions $\{Z\}$ and free directions $\{Y\}$, respectively. The force control law is given by $$F_z(t) = P_r(t) + d(t) + K_I(t) \int_0^t E_z(t)dt + E_p(t)E_z(t) - K_v(t)\dot{Z}(t) \tag{134}$$

where $P_r(t)$ is the desired force setpoint, $E_z(t) = P_r(t) - P_z(t)$ is the force tracking-error and the adaptation laws are:

$$d(t) = d(0) + \delta_1 \int_0^t q(t)dt + \delta_2 q(t)$$

$$K_I(t) = K_I(0) + \alpha_1 \int_0^t q(t)E_z^{*'}(t)dt + \alpha_2 q(t)E_z^{*'}(t)$$

$$K_p(t) = K_p(0) + \beta_1 \int_0^t q(t)E_z'(t)dt + \beta_2 q(t)E_z'(t)$$

$$K_v(t) = K_v(0) - \gamma_1 \int_0^t q(t)\dot{Z}'(t)dt - \gamma_2 q(t)\dot{Z}'(t)$$

-continued where $$q(t) = W_I E_z^*(t) + W_p \dot{E}_z(t) - W_v \dot{Z}(t) \text{ and}$$

$$E_z^*(t) = \int_0^t E_z(t)dt \text{ and } \{W_I, W_p, W_v\}$$

are desired weighting matrices.

The position control law is expressed as $$F_y(t) = \overline{d}(t) + \overline{K_p}(t)E_y(t) + \overline{K_v}(t)\dot{E}_y(t) + \overline{C}(t) + \overline{B}(t)\dot{R}(t) + \overline{A}(t)\ddot{R}(t) \tag{135}$$

where $R(t)$ is the desired position trajectory, $E_y(t) = R(t) - Y(T)$ is the position tracking-error and the adaptation laws are:

$$\overline{d}(t) = \overline{d}(0) + \overline{\delta}_1 \int_0^t r(t)dt + \delta_2 r(t)$$

$$\overline{K_p}(t) = \overline{K_p}(0) + \overline{v}_1 \int_0^t r(t)E_y'(t)dt + \overline{v}_2 r(t)E_y'(t)$$

$$\overline{K_v}(t) = \overline{K_v}(0) + \overline{\eta}_1 \int_0^t r(t)\dot{E}_y'(t)dt + \overline{\eta}_2 r(t)\dot{E}_y'(t)$$

$$\overline{C}(t) = \overline{C}(0) + \overline{\mu}_1 \int_0^t r(t)R'(t)dt + \mu_2 r(t)R'(t)$$

$$\overline{B}(t) = \overline{B}(0) + \overline{\gamma}_1 \int_0^t r(t)\dot{R}'(t)dt + \overline{\gamma}_2 r(t)\dot{R}'(t)$$

$$\overline{A}(t) = \overline{A}(0) + \overline{\lambda}_1 \int_0^t r(t)\ddot{R}'(t)dt + \overline{\lambda}_2 r(t)\ddot{R}'(t)$$

where $$r(t) = \overline{W}_p E_y(t) + \overline{W}_v \dot{E}_y(t)$$

and $\{\overline{W}_p, \overline{W}_v\}$ are desired weighting matrices.

The above controller adaptation laws are extremely simple and therefore the hybrid control algorithm can be implemented using high sampling rates ($\approx 1$ KHz); yielding improved performance. Under the adaptive hybrid controllers, both end-effectors are expected to exert the desired forces on the load while simultaneously moving on desired trajectories. The hybrid-hybrid control strategy is most available when simultaneous control of both position and force is required. The following example illustrates the hybrid-hybrid control strategy.

Consider the dual-arm manipulator and load, as discussed above in conjunction with FIG. 7, and suppose that both end-effectors are required to exert a constant desired force on the load in the x-direction while moving the load in the y-direction. In this situation, the x and y components of the load force are the same as developed in Section 2.

Suppose further that the desired force and position trajectories for both arms are specified as $$P_{xd}(t) = \pm 10_{Newton}$$

$$y_d(t) = 0.432[1 + 6\exp(-t/0.3) - 8\exp(-t/0.4)]_{meter}$$

so that the end-effectors move from the initial points $\{[0.432, -0.432], [2.432, -0.432]\}$ to the final points $\{[0.432, 0.432], [2.432, 0.432]\}$ while exerting a force of 10 NT on the load.

The two arms are controlled by identical and independent adaptive hybrid control laws given by $$T(t) = J'(\theta)\begin{pmatrix} F_x(t) \\ F_y(t) \end{pmatrix} \tag{136}$$

where $$F_x(t) = P_{rd}(t) + d(t) + K_I(t)e_x^*(t) + K_p(t)e_x(t) - K_v(t)\dot{x}(t)$$

$$F_y(t) = \overline{d}(t) + \overline{K_p}(t)\dot{e}_y(t) + \overline{K_v}(t)e_y(t) + \overline{C}(t)y_r(t) + \overline{B}(t)\dot{y}_r(t) + \overline{A}(t)\ddot{y}_r(t)$$

$$e_x(t) = P_{rd}(t) - P_x(t) = \text{force tracking error}$$

$$e_y(t) = y_{rd}(t) - y_r(t) = \text{position tracking-error}$$

$$e_x^*(t) = \int_0^t e_x(t)dt = \text{integral force error}$$

The adaptation laws for the force controller are:

$$d(t) = q(t) + \int_0^t q(t)dt$$

$$K_I(t) = 100 + 10\int_0^t q(t)e_x^*(t)dt$$

$$K_p(t) = 100 + 4\int_0^t q(t)e_x(t)dt$$

$$K_v(t) = 5000 - 1000\int_0^t q(t)\dot{x}(t)dt$$

where $$q(t) = e_x(t) - 10\dot{x}(t) + e_x^*(t)$$

The adaptation laws for the position controller are:

$$\overline{d}(t) = 0.5r(t) + 0.5\int_0^t r(t)dt$$

$$\overline{K_p}(t) = 2\int_0^t r(t)e_y(t)dt$$

$$\overline{K_v}(t) = 2\int_0^t r(t)\dot{e}_y(t)dt$$

$$\overline{C}(t) = 0.5\int_0^t r(t)y_r(t)dt$$

$$\overline{B}(t) = 0.5\int_0^t r(t)\dot{y}_r(t)dt$$

$$\overline{A}(t) = 0.5\int_0^t r(t)\ddot{y}_r(t)dt$$

where $$r(t) = 5000e_y(t) + 2000\dot{e}_y(t)$$

The integrals in the above adaptation laws are evaluated using the trapezoidal rule with dt=0.5 msec.

Figure 11A:
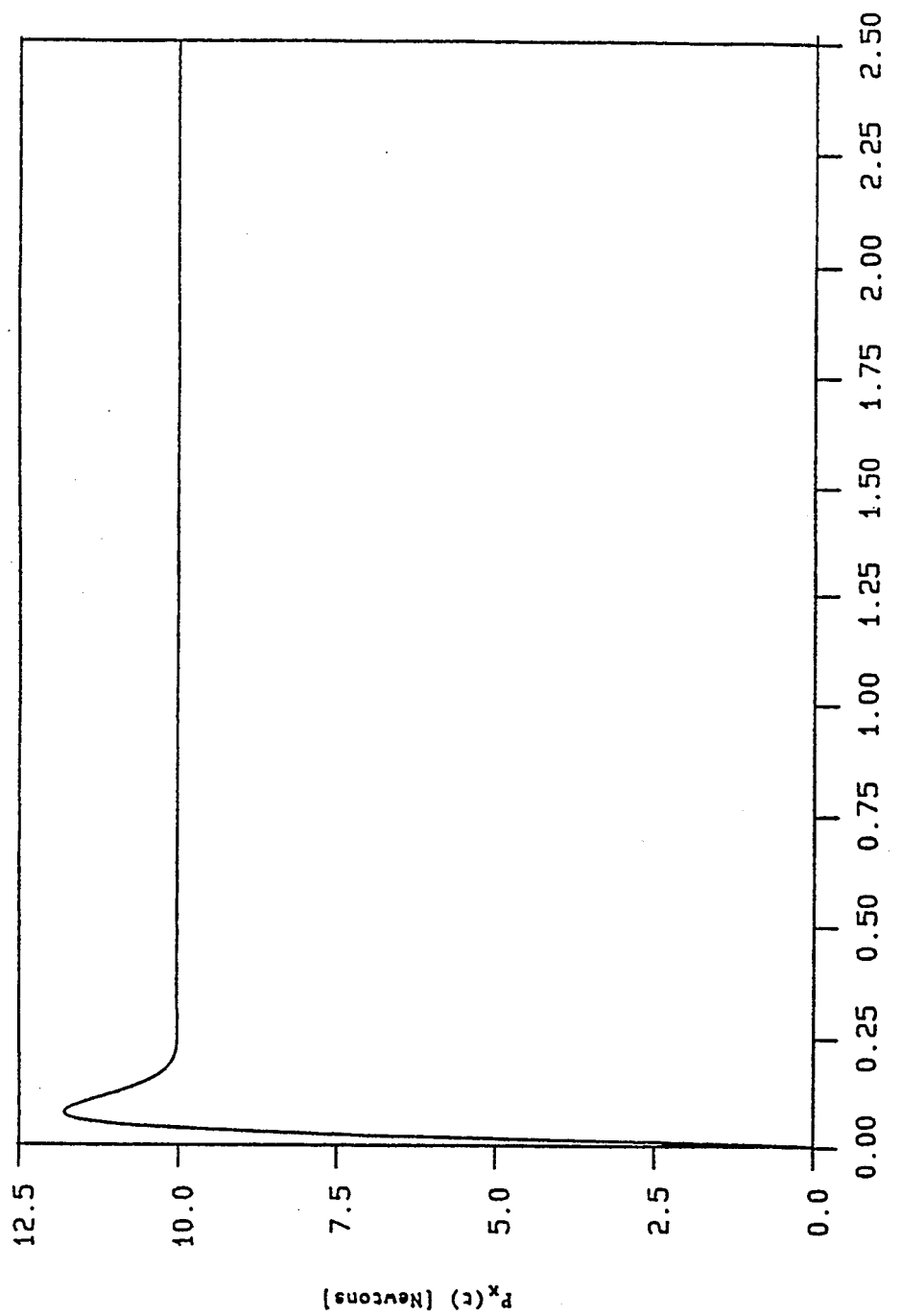
FIGS. 11$a$, 11$b$, 11$c$ and 11$d$, depict the results of a computer simulation in adaptive hybrid-hybrid control which are useful in performance evaluation of the invention.
Figure 11B:
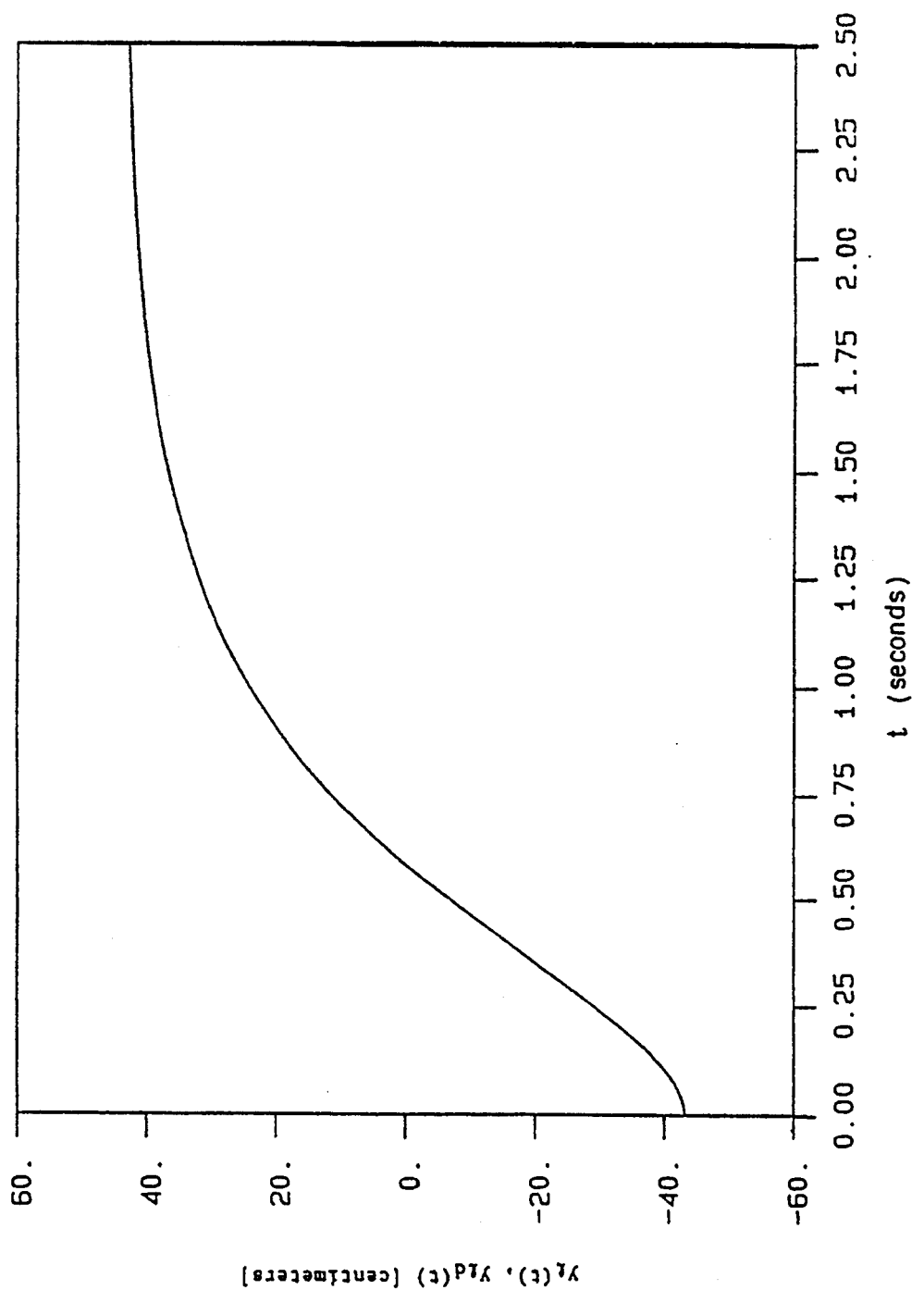
Figure 11C:
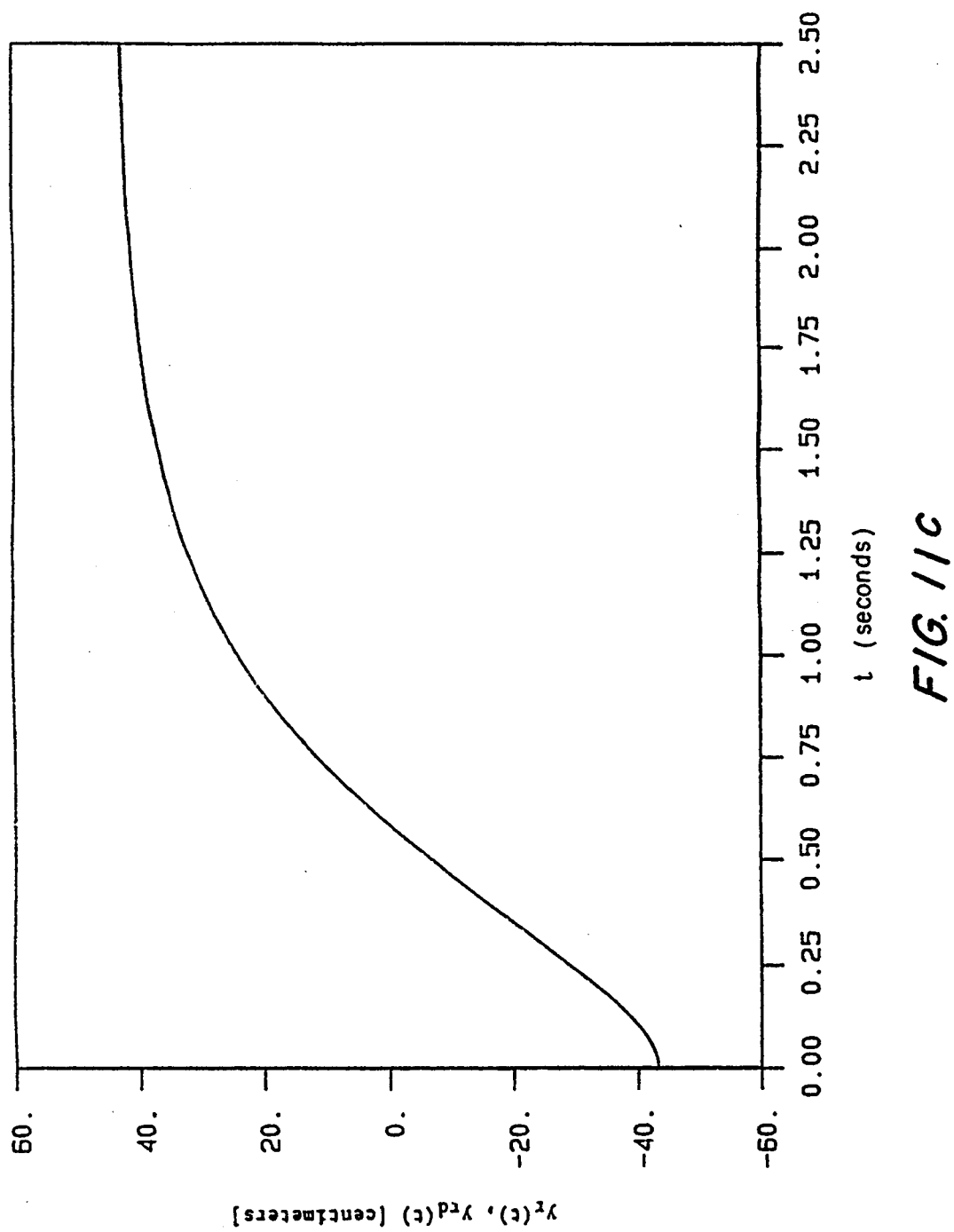
Figure 11D:
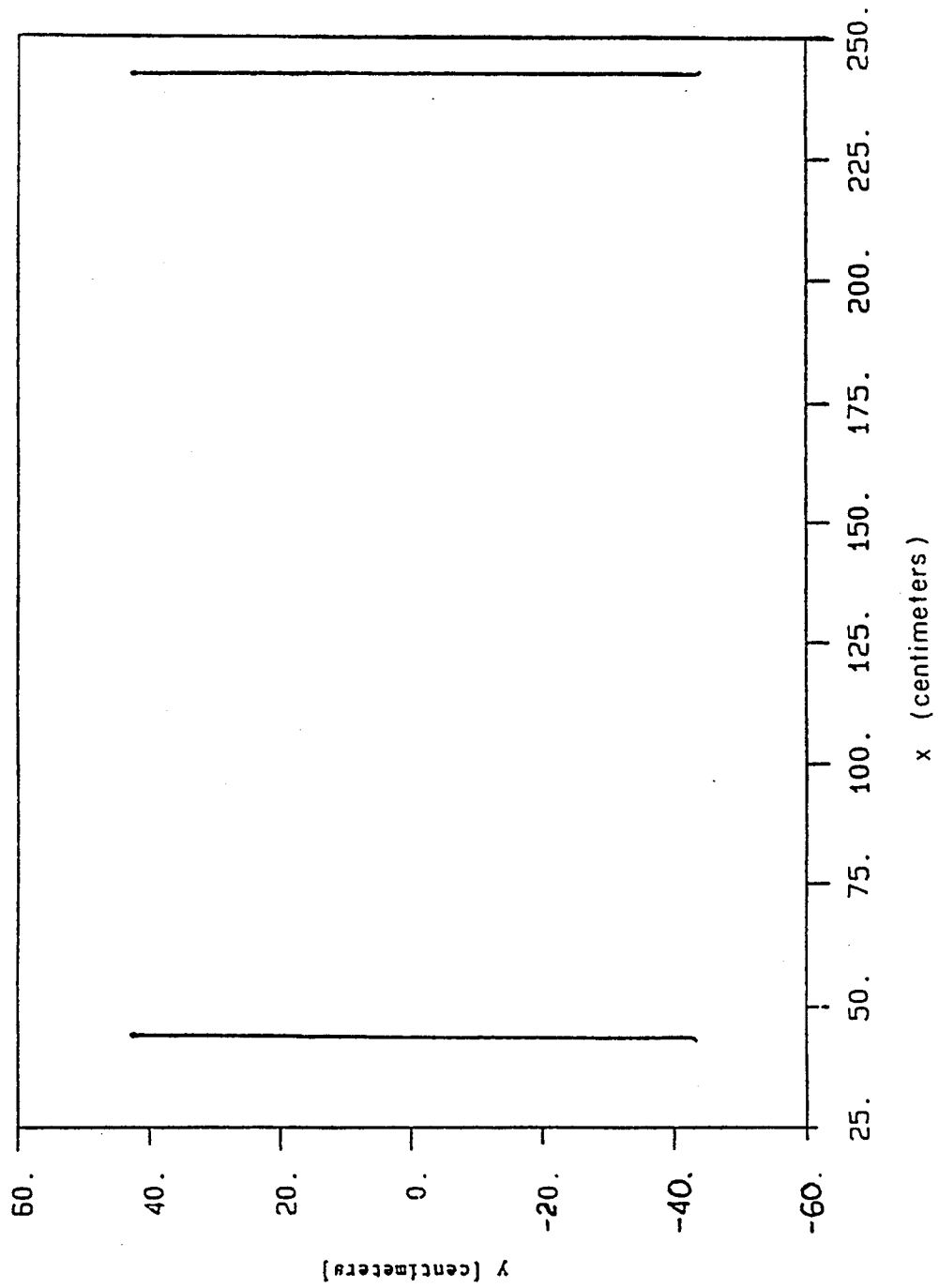

To evaluate the performance of the hybrid-hybrid control strategy, the nonlinear dynamic models of the arms (Equation 111) and the linear adaptive control laws (Equation 136) are simulated on a DEC-VAX 11/750 computer with the sampling period of 0.5 msec and the simulation results are shown in FIGS. 11(a)-(d). FIG. 11(a) shows that the force exerted by the end-effectors on the load in the x-direction is equal to the desired setpoint of 10 Nt. FIGS. 11(b) through 11(c) indicate that the coordinates of the end-effectors in the y-direction track the desired position trajectories. The paths traced by the end-effectors in the horizontal plane are shown in FIG. 11(d). It is seen that both end-effectors move in initially to produce the desired force and then track vertical straight lines. Thus the adaptive hybrid controllers perform extremely well for simultaneous force and position control.

Three adaptive control strategies for cooperative dual-arm robots have been described. In these strategies, each robot arm is considered a subsystem of the total system and is controlled independently using an adaptive controller in the low level of the control hierarchy. Each controller ensures that the controlled variables follow desired commands and reject unwanted cross-coupling effects from other subsystems which are treated as "disturbances." The subsystems are coordinated through trajectory generators in the intermediate level, where synchronous desired trajectories for both arms are specified in a common task-related frame of reference. An important feature of the present approach is that the overall control system for N cooperative arms is reduced to N decentralized independent single-arm controllers. The control schemes do not require communication and data exchange among individual controllers, which is an appealing feature from both computational and reliability points of view. Furthermore, available techniques for single-arm control can be utilized directly in multiple-arm environments.

The control strategies described herein do not require the knowledge of the load parameters such as mass and stiffness or the robot dynamic parameters such as link masses and inertias, and can therefore cope with uncertainties or variations in the system parameters. Furthermore, the complex dynamic model of the arms are not used in generating the control actions. The control schemes are very simple and extremely fast for on-line implementation with high sampling rates, yielding improved dynamic performance. The control methodology described herein can also be utilized in the coordinated control of N-arm robots when N exceeds two.

APPENDIX

In this Appendix, we obtain a simple expression for the force on a rigid load held by two end-effectors in a horizontal plane.

Figure 8:
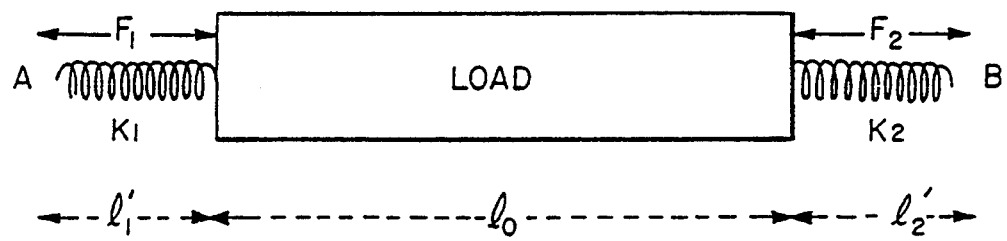
FIG. 8 depicts a simplified load diagram that is useful in developing a better understanding of the invention.

Let us consider a rigid load of length $l_0$ held firmly by two end-effectors equipped with force/torque sensors as shown in FIGS. 7 and 8. The sensors are modelled as linear springs with stiffness coefficients $K_1$ and $K_2$ and natural lengths $l_1$ and $l_2$. The forces $F_1$ and $F_2$ exerted by the sensors on the rigid load are given by $$F_1 = K_1(l'_1 - l_1) \qquad (137)$$

$$F_2 = K_2(l'_2 - l_2) \qquad (138)$$

where $l'_1$ and $l'_2$ are instantaneous lengths of the springs. At equilibrium, the forces $F_1$ and $F_2$ must be equal; otherwise the load will reposition itself under the net force to reach the equilibrium condition. Let us denote the force exerted by the springs on the load by $F = F_1 = F_2$; hence $$F = F_1 = K_1[l'_1 - l_1 + l_0 + l_0 + l'_2 - l'_2 + l_2 - l_2] \qquad (139)$$

where equal and opposite terms are added in equation (139). From equation (139), we obtain $$F = K_1[L' - L - (l'_2 - l_2)] = K_1(L' - L) - K_1(l'_2 - l_2) \qquad (140)$$

where
$L' = l'_1 + l_0 + l'_2 =$ instantaneous distance AB
$L' = l_1 + l_0 + l_2 =$ "natural" distance AB with no force on the load, i.e. $(AB)_0$ Using $F = F_2 = K_2(l'_2 - l_2)$, equation (140) becomes $$F = K_1(L' - L) - K_1\left[\frac{F}{K_2}\right] \qquad (141)$$

$$F = \frac{K_1 K_2}{K_1 + K_2}[L' - L] = K_{eq}[L' - L] = K_{eq}[AB - (AB)_0]$$

where $K_{eq}$ is the equivalent stiffness coefficient of the springs obtained from $$\frac{1}{K_{eq}} = \frac{1}{K_1} + \frac{1}{K_2}.$$

Equation (141) gives a single expression for the force on the load at any instant time.

The above description presents the best mode contemplated in carrying out the invention. The invention is, however, susceptible to modifications and alternate constructions from the embodiments shown in the drawings and described above. Consequently, it is not the intention to limit the invention to the particular embodiments disclosed. On the contrary, the invention is intended to and shall cover all modifications, sizes and alternate constructions falling within the spirit and scope of the invention, as expressed in the appended claims when read in light of the description and drawings.

What is claimed is:

1. A controller for a manipulator wherein the manipulator and an environment of the manipulator form a complex, dynamic model with unknown parameter values; the controller comprising:
   an adaptive feedforward controller and an adaptive feedback controller including means for applying a feedback equation having position and velocity control terms;
   said feedforward and feedback controllers being independent and multivariable;
   means for generating an auxiliary signal;
   means for summing said auxiliary signal and adaptive gains and for outputting a control signal to said manipulator;
   said feedforward and feedback controllers having adaptive position feedforward and feedback control loops, respectively and adaptive position control means operating in accordance with the following position control law:

$$F_y(t) = f(t) + \overline{K}_p(t)\dot{E}_p(t) + \overline{K}_v(t)E_p(t) + \overline{C}(t)R(t) + \overline{B}(t)\dot{R}(t) + \overline{A}(t)\ddot{R}(t)$$

wherein R(t) is the desired position trajectory, $E_p$ is the position tracking error, $\overline{A}$, $\overline{B}$ and $\overline{C}$ are adaptive feedforward gains, $K_p$ and $K_v$ are adaptive feedback gains, f(t) is an auxiliary signal and $F_y(t)$ is an applied force.

2. A controller for a manipulator wherein the manipulator and an environment of the manipulator form a complex, dynamic model with unknown parameter values; the controller comprising:

a feedforward controller and an adaptive feedback controller including means for applying a feedback equation having force control terms;

said feedforward and feedback controllers being independent and multivariable;

means for generating an auxiliary signal;

means for summing said auxiliary signal and adaptive gains and for outputting a control signal to said manipulator;

said feedforward and feedback controllers having adaptive contact force control means operating in accordance with the following force control law:

$$F_z(t) = P_r(t) + d(t) + K_I(t)\int_0^t E(t)dt + K_p(t)E(t) - K_v(t)Z(t)$$

wherein $P_r(t)$ is a desired force reference signal, d(t) is an auxiliary force signal, $K_I(t)$, $K_p(t)$ and $K_v(t)$ are adaptive gains, E(t) is a force tracking error, Z(t) is a velocity and $F_z(t)$ is an applied force.

3. A controller for a manipulator wherein the manipulator and an environment of the manipulator form a complex, dynamic model with unknown parameter values; the controller comprising:

an adaptive feedforward controller and an adaptive feedback controller including means for applying a feedback equation having position and velocity control terms;

said feedforward and feedback controllers being independent and multivariable;

means for generating an auxiliary signal;

means for summing said auxiliary signal and adaptive gains and for outputting a control signal to said manipulator;

said controller further comprising position control means, force control means; and means for cross-coupling said position control means and force control means to compensate for said parameter values.

* * * * *